US011520971B2

(12) United States Patent
Chaturvedi et al.

(10) Patent No.: US 11,520,971 B2
(45) Date of Patent: Dec. 6, 2022

(54) SYSTEM AND METHOD FOR ARTIFICIAL INTELLIGENCE STORY GENERATION ALLOWING CONTENT INTRODUCTION

(71) Applicant: The Regents of the University of California, Oakland, CA (US)

(72) Inventors: Snigdha Chaturvedi, Santa Cruz, CA (US); Faeze Brahman, Santa Cruz, CA (US); Alexandru Petrusca, Santa Cruz, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 289 days.

(21) Appl. No.: 16/834,402

(22) Filed: Mar. 30, 2020

(65) Prior Publication Data
US 2020/0311341 A1 Oct. 1, 2020

Related U.S. Application Data

(60) Provisional application No. 62/826,992, filed on Mar. 30, 2019.

(51) Int. Cl.
*G06F 40/166* (2020.01)
*G06N 3/04* (2006.01)
*G06N 3/08* (2006.01)

(52) U.S. Cl.
CPC ............. *G06F 40/166* (2020.01); *G06N 3/04* (2013.01); *G06N 3/08* (2013.01)

(58) Field of Classification Search
CPC .......... G06F 3/067; G06F 3/14; G06F 40/166; G06F 40/289; G06F 40/30;
(Continued)

(56) References Cited

U.S. PATENT DOCUMENTS 8,355,903 B1 * 1/2013 Birnbaum ............. G06F 40/106
706/46
8,374,848 B1 * 2/2013 Birnbaum ............. G06F 40/40
706/46

(Continued)

OTHER PUBLICATIONS

Ba, et al., Layer normalization. CoRR, 2016.
(Continued)

*Primary Examiner* — Gerald Gauthier
(74) *Attorney, Agent, or Firm* — Wolter Van Dyke Davis, PLLC; Eugene Molinelli

(57) ABSTRACT

Techniques for artificial intelligence assisted story generation includes training a neural network with first training data that indicates text for one or more portions of a training story and second training data that indicates text for a subset of text for an immediately following portion and third training data that indicates full text for the same portion. First data is retrieved that indicates text for a first one or more portions of a different new story. Second data is also received that indicates text for a cued subset of a next portion of the new story. Third data is generated that indicates full text for the next portion of the new story based on the first data and the second data and the neural network. The third data is concatenated to the first data to produce output data that is stored.

15 Claims, 17 Drawing Sheets

(58) Field of Classification Search
CPC .. G06F 16/3344; G06F 16/335; G06F 16/345;
G06F 16/958; G06F 40/106; G06F
40/151; G06F 40/284; G06F 40/40; G06F
40/56; G06K 9/6261; G06N 3/04; G06N
3/08; G06N 5/04; G06N 20/00; G06N
3/008; G06N 5/02; G06Q 50/01; G06V
10/82; G06V 20/41; G06V 10/764; A63F
13/65; G10L 15/22
USPC .......................... 704/9, 1, 2; 463/30; 706/45
See application file for complete search history.

(56) References Cited

U.S. PATENT DOCUMENTS

| | | | | |
|---|---|---|---|---|
| 8,630,844 | B1* | 1/2014 | Nichols | G06F 40/151 706/46 |
| 8,688,434 | B1* | 4/2014 | Birnbaum | G06F 40/56 704/9 |
| 8,775,161 | B1* | 7/2014 | Nichols | G06F 16/335 706/46 |
| 8,821,271 | B2* | 9/2014 | Davison | A63F 13/65 463/31 |
| 8,886,520 | B1* | 11/2014 | Nichols | G06F 16/345 706/46 |
| 8,892,417 | B1* | 11/2014 | Nichols | G06N 5/02 706/46 |
| 8,990,065 | B2* | 3/2015 | Raskino | G06F 16/345 704/7 |
| 10,402,495 | B1* | 9/2019 | Rush | G06F 40/30 |
| 10,540,573 | B1* | 1/2020 | Li | G06K 9/6261 |
| 11,210,470 | B2* | 12/2021 | Kim | G06F 40/30 |
| 11,210,836 | B2* | 12/2021 | Amer | G06V 20/46 |
| 2010/0228695 | A1* | 9/2010 | Kaplan | G06N 3/008 706/45 |
| 2011/0087486 | A1* | 4/2011 | Schiller | G06F 40/166 715/256 |
| 2013/0144605 | A1* | 6/2013 | Brager | G06F 16/30 704/9 |
| 2015/0309965 | A1* | 10/2015 | Brav | G06F 40/284 704/9 |
| 2015/0324349 | A1* | 11/2015 | Weiss | G06F 16/3344 704/9 |
| 2015/0339288 | A1* | 11/2015 | Baker | G06F 40/166 704/9 |
| 2016/0132488 | A1* | 5/2016 | Clark | G06N 20/00 704/9 |
| 2016/0171979 | A1* | 6/2016 | Breazeal | G10L 15/22 704/9 |
| 2017/0293860 | A1* | 10/2017 | Fyffe | G06N 5/04 |
| 2017/0351675 | A1* | 12/2017 | Marra | G06F 3/14 |
| 2019/0129934 | A1* | 5/2019 | Kadav | G06F 3/067 |
| 2019/0208025 | A1* | 7/2019 | Kong | G06Q 50/01 |
| 2019/0304104 | A1* | 10/2019 | Amer | G06F 40/35 |
| 2019/0304157 | A1* | 10/2019 | Amer | G06V 20/41 |
| 2020/0081980 | A1* | 3/2020 | Eisenberg | G06F 40/30 |
| 2020/0104680 | A1* | 4/2020 | Reed | G06V 10/82 |
| 2020/0311341 | A1* | 10/2020 | Chaturvedi | G06N 20/00 |

OTHER PUBLICATIONS

Bahdanau, et al., Neural machine translation by jointly learning to align and translate. In ICLR, 2015.
Clark, et al., Neural text generation in stories using entity representations as context. In NAACL, pp. 2250-2260, 2018.
Clark, et al., Creative writing with a machine in the loop: Case studies on slogans and stories. In IUI, pp. 329-340. ACM, 2018.
Fan, et al. Hierarchical neural story generation. Proceedings of the 56th Annual Meeting of the Association for Computational Linguistics, pp. 889-898, 2018.
Fan, et al, Strategies for structuring story generation. In ACL 2019, pp. 2650-2660, 2019.
Gervas, et al., Story plot generation based on cbr. In Applications and Innovations in Intelligent Systems XII, 28(1):33-46, 2005.
Jain, et al., Story generation from sequence of independent short descriptions. CoRR, pp. 234-242, 2017.
Kapadia, et al, Computer-assisted authoring of interactive narratives. Proceedings of the 19th Symposium on Interactive 3D Graphics and Games, i3D 2015, 2015.
Kingma, et al., A method for stochastic optimization. arXiv preprint arXiv:1412.6980, 2014.
Lebowitz, Planning stories. In Proceedings of the cognitive science society, pp. 234-242, 1987.
LeCun, et al., Deep learning. Nature, 521:436-44, May 2015.
Li, et al., A persona-based neural conversation model. In ACL, 2016.
Liu, et al., Generating Wikipedia by summarizing long sequences. In International Conference on Learning Representations, 2018.
Manjavacas, et al., Synthetic literature: Writing science fiction in a co-creative process. In CC-NLG 2017, 2017.
Martin, et al., Event representations for automated story generation with deep neural nets. In AAAI, 2018.
Mostafazadeh, et al., A corpus and cloze evaluation for deeper understanding of commonsense stories. In NAACL, 2016.
Perez, et al., Mexica: A computer model of a cognitive account of creative writing. J. Exp. Theor. Artif. Intell., 13:119-139, Apr. 2001.
Jullie Porteous and Mike Cavazza. Controlling narrative generation with planning trajectories: the role of constraints. In ICIDS, pp. 234-245, 2009.
Riedl, et al., Narrative planning: Balancing plot and character. J. Artif. Int. Res., 39:217-268, 2010.
Roemmele, et al., Creative Help: A Story Writing Assistant. In Interactive Storytelling, pp. 81-92. Springer International Publishing, 2015.
Roemmele, Writing Stories with Help from Recurrent Neural Networks. In AAAI Conference on Artificial Intelligence, pp. 4311-4312, 2016.
Rose, et al., Automatic keyword extraction from individual documents. Text Mining: Applications and Theory, pp. 1-20, 2010.
Sutskever, et al., Sequence to sequence learning with neural networks. In NIPS, pp. 3104-3112, 2014.
Swanson, et al., Say Anything: Using Textual Case-Based Reasoning to Enable Open-Domain Interactive Storytelling. ACM Transactions on Interactive Intelligent Systems (TiiS), 2(3), Sep. 2012.
Tambwekar, et al., Controllable neural story plot generation via reward shaping. In IJCAI-19, pp. 5982-5988, 2019.
Vaswani, et al., Attention is all you need. In NIPS, pp. 5998-6008, 2017.
Xing, et al., Topic aware neural response generation. AAAI, 17:3351-3357, 2017.
Yao, et al., Plan-and-write: Towards better automatic storytelling. AAAI, 2019.

\* cited by examiner

SYSTEM AND METHOD FOR ARTIFICIAL INTELLIGENCE STORY GENERATION ALLOWING CONTENT INTRODUCTION

CROSS-REFERENCE TO RELATED APPLICATIONS

This application claims benefit of Provisional Appln. 62/826,992, filed Mar. 30, 2019, the entire contents of which are hereby incorporated by reference as if fully set forth herein, under 35 U.S.C. § 119(e).

BACKGROUND

In natural language processing and information retrieval, explicit semantic analysis (ESA) is a vectoral representation of text (individual words or entire documents) that uses a document corpus as a knowledge base. The set of N documents is collectively interpreted as a space of concepts explicitly defined and described by humans. The document corpus includes a given number, N, documents, such as news articles or Wikipedia entries.

The text in the documents is broken up into tokens, where each token represents a word or string of symbols between spaces or roots of words and prefixes and suffixes, and punctuation, such as apostrophes. Tokens that co-occur in the corpus are considered to be related and the frequency with which the tokens are used together or repeated is used to express the meaning of a token, i.e., its semantics. Word embeddings are basically a form of word representation that bridges the human understanding of language to that of a machine. The process of converting a word into a real-valued vector is called embedding.

One early form of embedding used an N-element vector with an entry in every element corresponding to a document where the word or phrase is used. The number of times a term occurs in a document is called its term frequency (tf). Inverse document frequency (idf) diminishes the weight of terms, like the word "the," which occur very frequently in the document set, and increases the weight of terms that occur rarely. The idf is often used as a weighting factor in searches of information retrieval, text mining, and user modeling. Term frequency-inverse document frequency (tf-idf), is a numerical statistic that is intended to reflect how important a word is to a document in the corpus and is often used in assigning a value to an element in the vector. The tf-idf value increases proportionally to the number of times a word appears in the document and is normalized by the number of documents in the corpus that contain the word, which helps to adjust for the fact that some words appear more frequently in general. Specifically, in ESA, a term is represented as a column vector in the tf-idf matrix of the text corpus. A document (string of terms) is represented in ESA as the centroid of the vectors representing its words. These vectors are amenable to use with neural networks as described in more detail below.

More recently, instead of predetermining manually the statistics to be used as vector elements, neural networks have been developed that learn the dimensions of relevance, based on the co-occurrence of tokens in the corpus, and a particular result to be obtained. Each unique token is represented by an identifier, e.g., the letters in its text, or a sequence number for each successive unique token, and a number of dimensions, e.g., T=512, is set for the vectors; but, the meaning of each dimension is left free, and the neural network determines real number values for the different dimensions. The neural network parameters are learned using various known training methods, guided by the corpus and a particular result to be obtained for a given training set, e.g., translation to a different language, data retrieval, or text prediction, e.g., conversation or story generation, among others.

Automatic story generation requires composing a coherent and fluent passage of text about a sequence of events. The first and foremost challenge of the general problem of automatic storytelling is generating longer and more interesting sequences of text as opposed to repeating general and trivial sentences. Moreover, stories need to stay consistent across a topic and theme, which requires modeling and capturing long range dependencies.

Most state-of-the-art models (Jain et al., 2017; Fan et al., 2018; Martin et al., 2018; Clark et al., 2018) are largely based on standard input token sequence to output token sequence (seq2seq) models (Sutskever et al., 2014) developed for translation from one language to another, implemented as neural networks, and generate the entire story at once. In this setting, the user has little or no control over the generated story, except to accept or reject it. Thus, if the story does not fit the user's needs, it is not useful and the user is forced to reject the story, with limited opportunities for influencing the next version of the story.

SUMMARY

Techniques are provided for artificial intelligence story generation allowing content introduction. In various embodiments, the system accepts from a user a mid-level sentence abstraction in the form of cue phrases. Cue phrases allow the user to inform the system of what concepts to use next in the story; and thus, affects the next text generated by the model and thus what happens next in the story.

In a first set of embodiments, a method for artificial intelligence assisted story generation includes training a neural network with first training data that indicates text for one or more portions of a training story and second training data that indicates text for a subset of text for an immediately following portion of the training story and third training data that indicates full text for the immediately following portion of the training story. The method also includes retrieving from a computer-readable medium first data that indicates text for a first one or more portions of a different new story; and, receiving second data that indicates text for a cued subset of a next portion of the new story. Still further, the method includes generating third data that indicates full text for the next portion of the new story based on the first data and the second data and the neural network. Yet further, the method includes concatenating the third data to the first data to produce output data and writing the output data to the computer-readable medium.

In some embodiments of the first set, the text for the cued subset is received from a human user. In some embodiments of the first set, the first data for a next iteration of the method is set equal to the output data. In some embodiments of the first set, each portion of the first one or more portions and the next portion and the second one or more portions and the immediately following portion is a sentence.

In some embodiments of the first set, the neural network includes two separate attention based encoding networks and a combination decoding network. The first attention based encoding network generates a context-sensitive query vector and context-sensitive key vector and context-sensitive value vector based on a first matrix of vectors that are based on the first data. The second attention based encoding network generates a cue-sensitive query vector and cue-sensitive key vector and cue-sensitive value vector based on a second matrix of vectors that are based on the second data. The combination decoding network generates a third matrix of vectors based at least in part on the context-sensitive query vector and the context-sensitive key vector and the context-sensitive value vector and the cue-sensitive query vector and the cue-sensitive key vector and the cue-sensitive value vector. The third data is based on the third matrix of vectors.

In other sets of embodiments, a non-transient computer-readable medium or an apparatus is configured to perform one or more steps of the above methods.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which.

DETAILED DESCRIPTION

A method and apparatus are described for artificial intelligence assisted story generation. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus, a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5X to 2X, for example, about 100 implies a value in a range from 50 to 200. Moreover, all ranges disclosed herein are to be understood to encompass any and all sub-ranges subsumed therein. For example, a range of "less than 10" for a positive only parameter can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some embodiments of the invention are described below in the context of five-sentence stories, with cued input, e.g., input supplied by a user, contributing to each new sentence. However, the invention is not limited to this context. In other embodiments, longer or shorter stories are used with cued input contributing to each new portion, where a portion is a sentence or portion thereof, or multiple sentences, or a portion is a paragraph or a chapter.

1. Overview

Figure 1A:
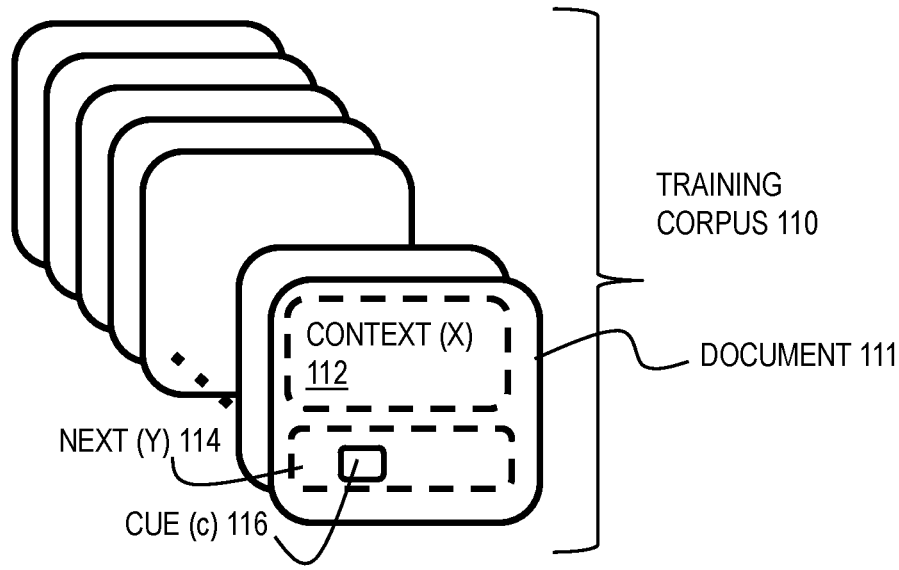
FIG. 1A is a block diagram that illustrates an example training corpus, according to an embodiment.

FIG. 1A is a block diagram that illustrates an example training corpus 110, according to an embodiment. The training corpus 110 includes multiple documents, such as document 111. The documents 111 for the corpus 110 are selected to be appropriate for the type of story to be told. Thus if a news story is to be written based on supplied facts, then the documents are each news stories. In an example embodiment, a fictional story is to be generated; and, the documents can fit one of the types of fiction, such as poetry, short stories and novels.

In the illustrated embodiment, a new approach is taken that allows a human user to introduce content as the story unfolds, so that the resulting story is acceptable for that user. It was determined that an advantageous way to train an artificial intelligence system to incorporate content from an external source, such as a human user, would be to consider each new portion to be added to the story, e.g., each sentence, as added to an existing body of text. The existing body of text provides context for the next portion of the story, and so the existing portion of the story is called the context, represented by the symbol X, and is indicated in FIG. 1A as portion 112 of document 111. The next portion of the story, e.g., the next sentence, to be output by the artificial intelligence system, is represented by the symbol Y, and is indicated in FIG. 1A as portion 114. The significant part of the next portion Y is a subset of the tokens in Y called the cue phrase; and is represented by the symbol c; and, is indicated in FIG. 1A as cue 116. The artificial intelligence system is to be trained so that given X and c, the system will produce the next portion Y. The cue phrase can be provided by any entity outside the system, such as a knowledge base or a human user. Yet the artificial intelligence system incorporates the context of the preceding text to adopt the cued phrase in a manner expected of storytelling exemplified within the corpus 110.

It is assumed that the first portion, e.g., the first sentence, is provided to the system. A cue phrase c for the second portion is also provided to initiate the process. Thus, for training purposes, each document provides several examples of generating a next portion: 1) generating the second portion based on the context X of only the first portion and the first cue phrase for the second portion; 2) generating the third portion based on the context X of the first two portions and the second cue phrase for the third portion; etc. If the document is made up of P portions, then there are P−1 training pairs of context X and Y available. If each of M documents have at least P portions, then there are at least M*(P−1) training pairs.

For training purposes, a means of determining the P−1 cue phrases c, one for each next portion, is provided. These could be picked manually by a human trainer; or such a human selection can be simulated, for purposes of determining feasibility, by using known tools to determine automatically a key part of the next portion, such as topic words, or distinctive entities or noun phrases in the sentence, or the head word in a dependency parse of the sentence (where "dependency parse" is a known term of art), etc. In the illustrated embodiment described in more detail in an examples section, below, cue phrases relevant to the training sentences were determined using a RAKE algorithm for extracting key phrases from a sentence.

Figure 1B:
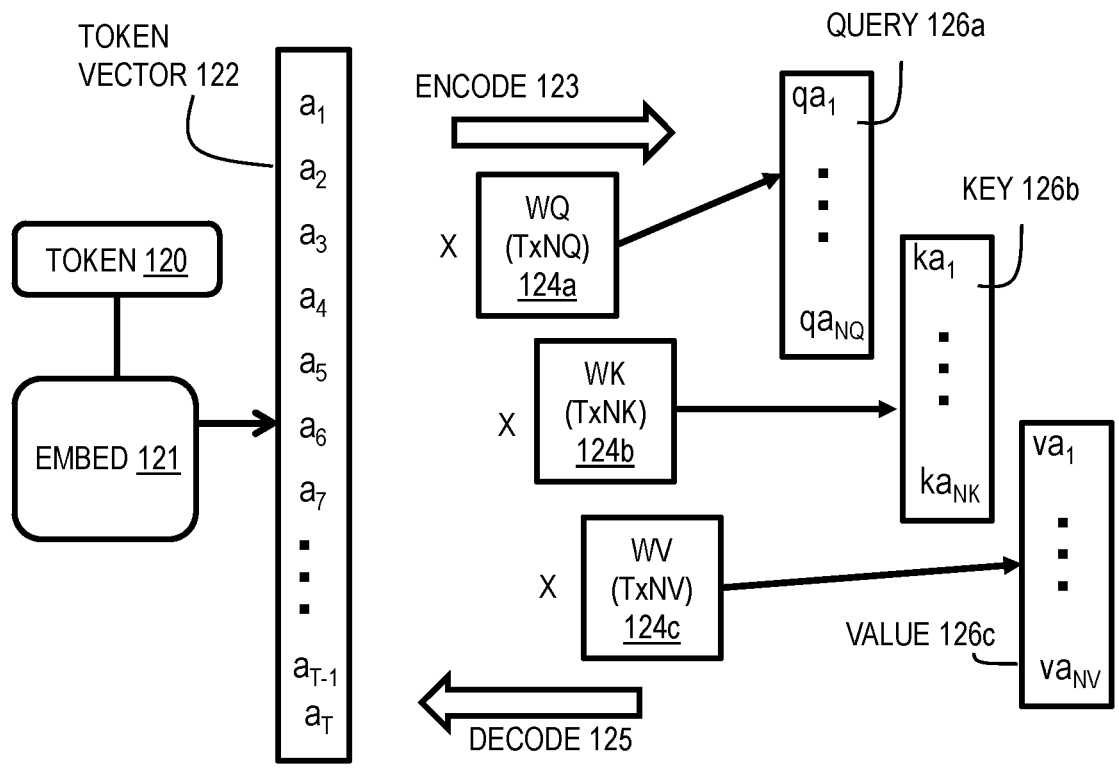
FIG. 1B is a block diagram that illustrates example transformation matrices for reducing the dimensionality of vectors that represent tokens in a document, such as a document in the training corpus, according to an embodiment.

FIG. 1B is a block diagram that illustrates example transformation matrices for reducing the dimensionality of vectors 122 that represent tokens 120 in a document, such as a document 111 in the training corpus 110, according to an embodiment. To distinguish many nuances of semantics, each token 120 is embedded in a vector 122 of expansive dimension T, say 256 to 1024 dimensions. The formation of the vectors is controlled such that tokens with similar meanings are close together in the vector space of these T dimensions and tokens with unrelated meanings are far apart. The function that accomplishes this is the embed function 121 that can be borrowed from other work, or previous pretrained models, or that can be trained with the rest of the artificial system. The elements of the resulting vector for one token are represented by $a_1$ through $a_T$.

Yet the semantics for a particular natural language application (such as translation, data retrieval in response to a query, or predicting the next sentence in a conversation or story) can be a subset of the fully loaded semantics and is generally captured in projections of the full dimensional space into a lower dimensional space. This projection into lower dimensional space has been described in the literature as encoding (and the reverse operation is called decoding), and a common terminology for three projections found effective in many applications, including data retrieval, are called a query vector 126a, a key vector 126b and a value vector 126c. The sizes of these vectors can be equal, or they can each be of different size, e.g., of dimensions NQ<T, NK<T, and NV<T, respectively, as illustrated in FIG. 1B. For the combinations described below, it is advantages for the dimensions of all three vectors to be equal; and they are assumed to be equal in the examples presented in the examples section. For token vector 122, having elements $a_1$ through $a_T$, the query vector has elements $qa_1$ through $qa_{NQ}$, the key vector has elements $ka_1$ through $ka_{NK}$, and the value vector has elements $va_1$ through $va_{NV}$. The vector 122 is transformed to these lower dimension vectors using projection matrices WQ 124a, WK 124b and WV 124c, respectively. Assuming the vector 122 is a 1×T column vector and the lower dimension vectors are 1×N (N<T), by definition these projection matrices would have dimensions T×N, i.e., T×NQ, T×NK, and T×NV, respectively. The projection matrices WQ 124a, WK 124b and WV 124c that accomplish this can be derived from other work; or can be trained with the rest of the artificial system based on the training corpus 110.

Figure 1C:
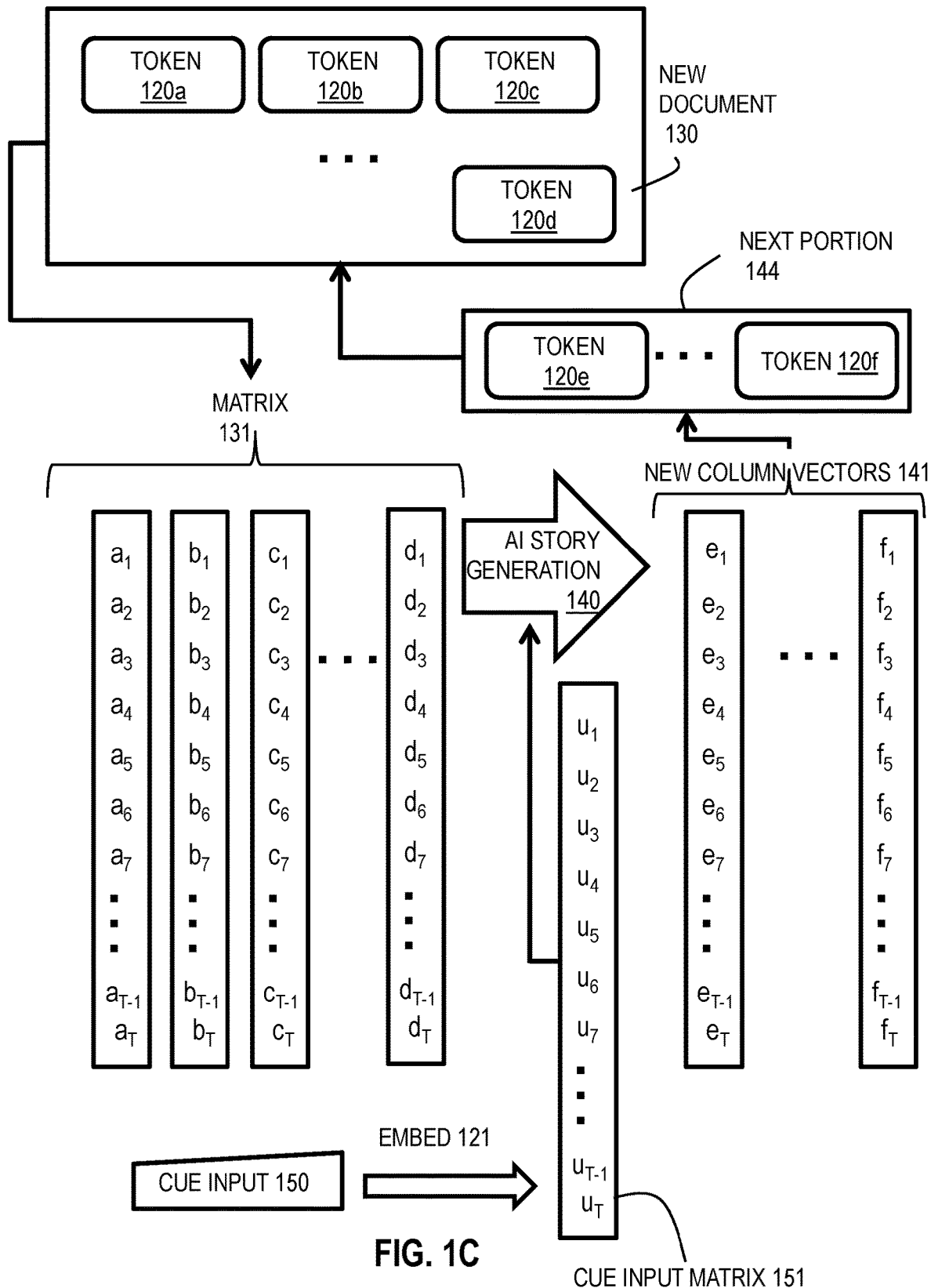
FIG. 1C is a block diagram that illustrates a work flow for generating new portions of a story based on a story already produced and a cued input, according to an embodiment.

FIG. 1C is a block diagram that illustrates a work flow for generating new portions of a story based on a story already produced and cued input, according to an embodiment that uses artificial intelligence with externally supplied cue phrases intermittently or regularly during story generation. A new document 130 is generated incrementally as follows. A starting portion (e.g., the first portion supplied initially, e.g., from a human, based on a title, or at random) includes one or more tokens represented in FIG. 1C by token 120a, token 120b, token 120c, ellipsis indicating one or more other tokens, and token 120d. Using part of the artificial intelligence system, each token 120a through 120d is embedded in a vector with corresponding elements $a_1$ through $a_T$, $b_1$ through $b_T$, $c_1$ through $c_T$, and $d_1$ through $d_T$, respectively, to produce a context matrix 131. In addition, a cue phrase is input at cue input module 150 and embedded by embed process 121 into one or more cue input vectors, e.g., cue input matrix 151 in FIG. 1C with at least one vector having elements $u_1$ through $u_T$.

The artificial intelligence (AI) story generation module 140 produces one or more new column vectors 141, depicted in FIG. 1C as vectors with elements $e_1$ through $e_T$, ellipsis, and $f_1$ through $f_T$, respectively, which are associated with corresponding text tokens 120e through 120f, respectively, with ellipsis indicating zero or more intervening vectors and corresponding tokens. To determine the meaning of the context in matrix 131 and the cue phrase in matrix 151, the artificial intelligence story generation module 140 of system 100 uses and combines the lower dimension vectors associated with each vector, as described in more detail below. Following that, a Softmax function is used to convert the final vector representation into a probability distribution over the training vocabulary. The system then predicts/generates the most probable token according to the Softmax result. The tokens 120e through 120f provide the next portion 144 of text for the story. The next portion 144 is added to the new document 130, e.g., concatenated at the end of the new document 130 growing that document to an updated new document 130. In some embodiments, the cue phrase is supplied intermittently, and thus not input at every step, and the process continues without the cue phrase or with a default phrase or a phrase selected from the context as the cue phrase.

The process is repeated with the updated new document 130 until the new document 130 is considered complete by some criterion. Any criterion or criteria can be used to terminate the process, e.g., reaching a set number of sentences or paragraphs or chapters, or generating a next portion that is too similar to previous portions, or failure to provide another cued input phrase, or an explicit stop story commend received from an operator of the artificial intelligence system.

Figure 1D:
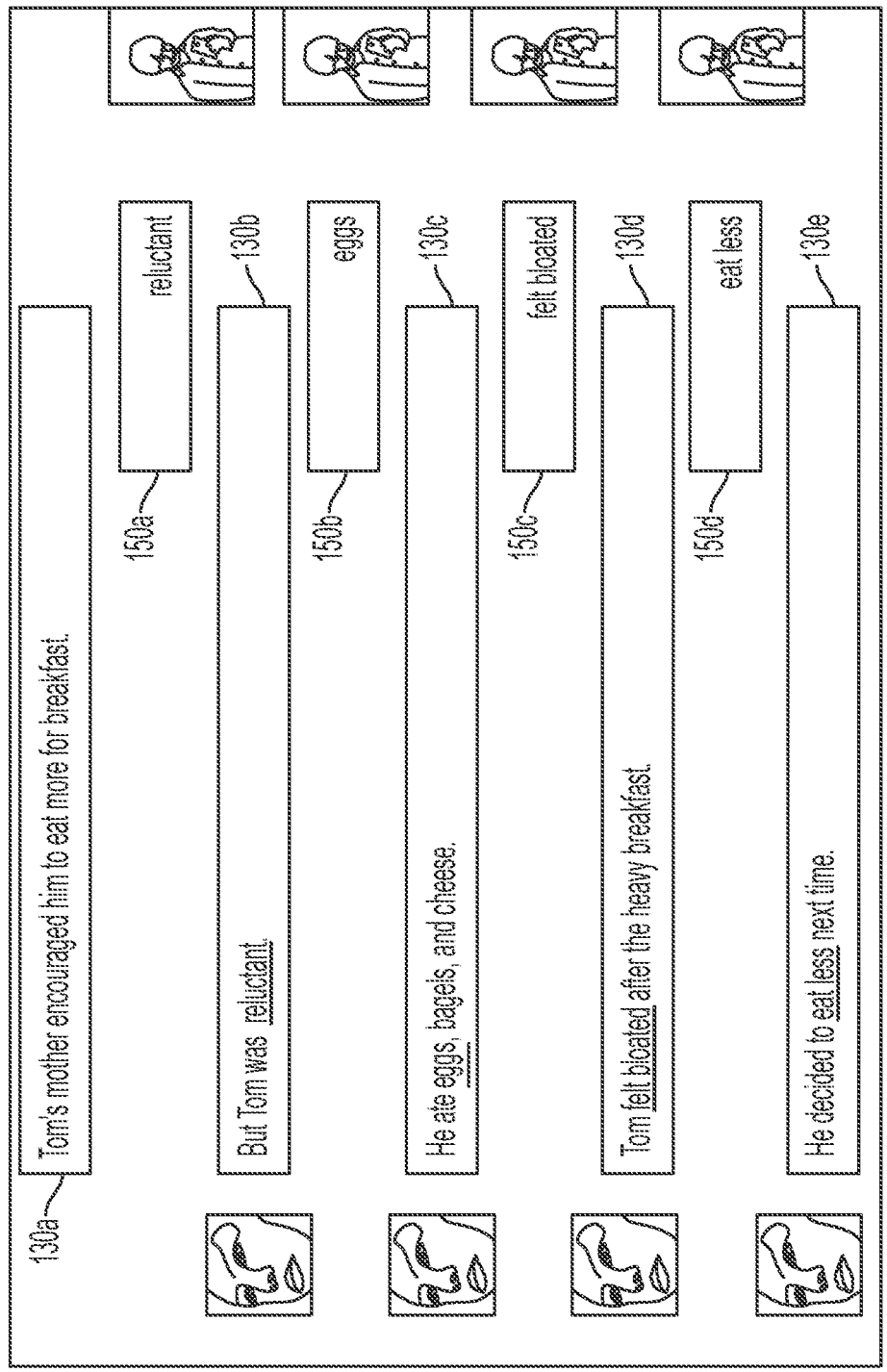
FIG. 1D is a block diagram that illustrates an example user experience in using the artificial intelligence assisted story generation system, according to an embodiment.

FIG. 1D is a block diagram that illustrates an example user experience in operating the artificial intelligence assisted story generation system, according to an embodiment. This example is based on a training set of 88,344 5-sentence stories, with each portion of the story corresponding to one sentence. The original context for the story is the sentence "Tom's mother encouraged him to eat more for breakfast." A first cue phrase, consisting of the single token "reluctant," is input to affect the generation of the second sentence. The resulting second sentence is "But Tom was reluctant." A second cue phrase, consisting of the single token "eggs," is input to affect the generation of the third sentence. The resulting third sentence is "He ate eggs, bagels, and cheese." A third cue phrase, consisting of the two tokens "felt heavy," is input to affect the generation of the fourth sentence. The resulting fourth sentence is "Tom felt bloated after the heavy breakfast." A fourth cue phrase consisting of the two tokens "eat less" is input to affect the generation of the fifth and last sentence. The resulting last sentence is "He decided to eat less next time." This story is more likely to be satisfactory to the user, because the user impacted the generation of the story at multiple points during the generation of the story. This is likely to be superior to stories generated with extant systems that only allow the user to provide input at the beginning, e.g., the first sentence or title of the document.

Figure 2A:
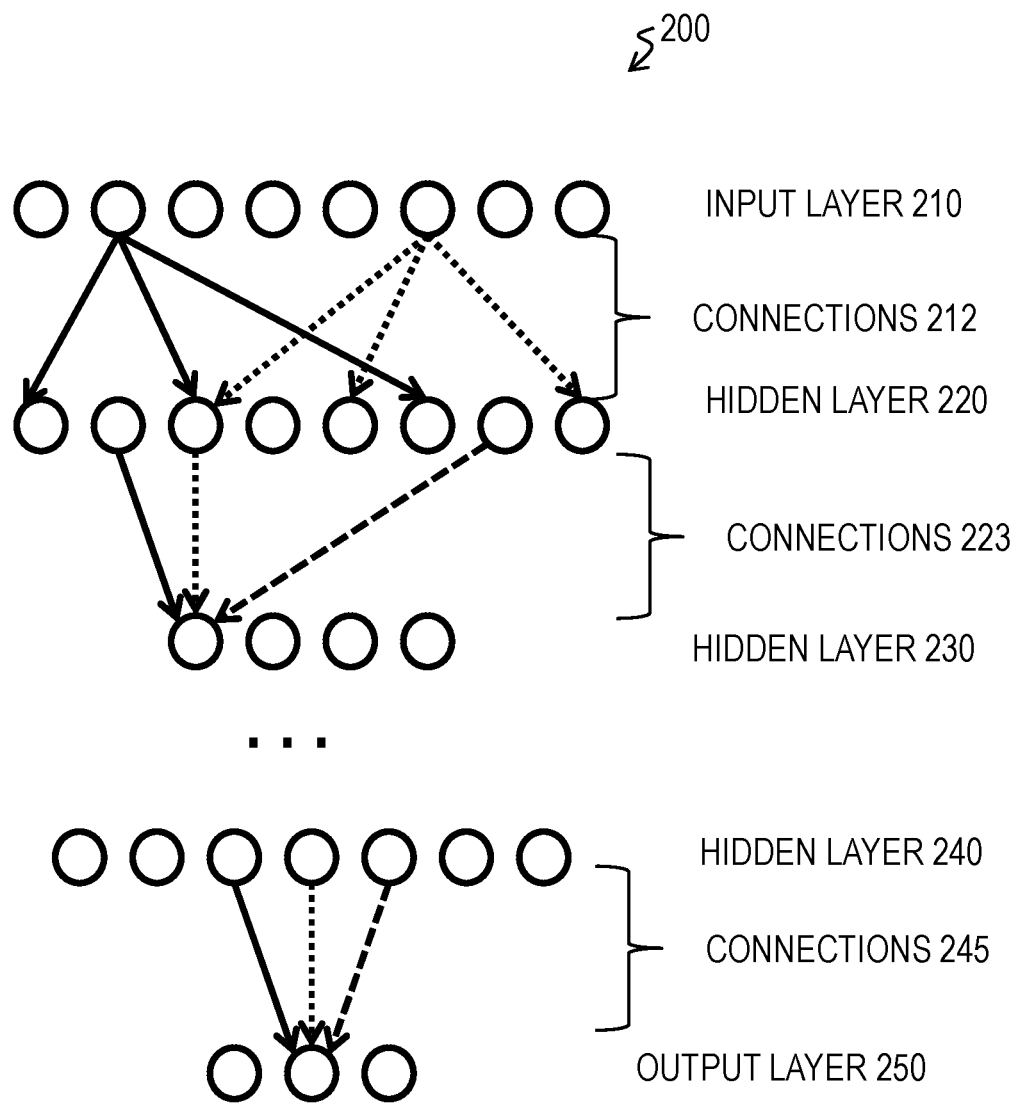
FIG. 2A is a block diagram that illustrates an example neural network for illustration.

Effective training of an artificial intelligence system with the characteristics described above can be achieved using neural networks, widely used in image processing and natural language processing. FIG. 2A is a block diagram that illustrates an example neural network 200 for illustration. A neural network 200 is a computational system, implemented on a general-purpose computer, or field programmable gate array, or some application specific integrated circuit (ASIC), or some combination, which is made up of an input layer 210 of nodes, at least one hidden layer 220, 230 or 240 of nodes, and an output layer 250 of one or more nodes. Each node is an element, such as a register or memory location, that holds data that indicates a value. The value can be code, binary, integer, floating point or any other means of representing data. Values in nodes in each successive layer after the input layer in the direction toward the output layer is based on the values of one or more nodes in the previous layer. The nodes in one layer that contribute to the next layer are said to be connected to the node in the later layer. Connections 212, 223, 245 are depicted in FIG. 2A as arrows. The values of the connected nodes are combined at the node in the later layer using some activation function with scale and bias (also called weights) that can be different for each connection. Neural networks are so named because they are modeled after the way neuron cells are connected in biological systems. A fully connected neural network has every node at each layer connected to every node at any previous or later layer.

Figure 2B:
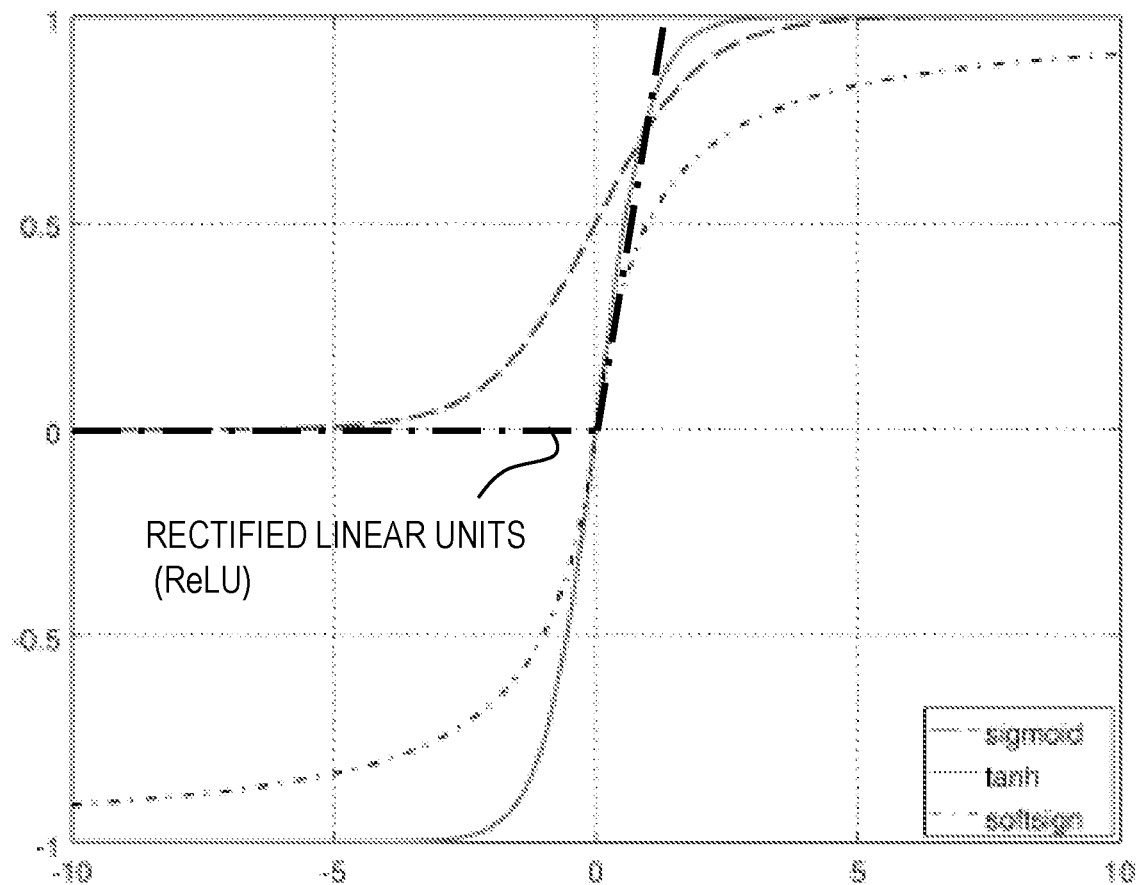
FIG. 2B is a plot that illustrates example activation functions used to combine inputs at any node of a feed forward neural network, according to various embodiments.

FIG. 2B is a plot that illustrates example activation functions used to combine inputs at any node of a neural network. These activation functions are normalized to have a magnitude of 1 and a bias of zero; but when associated with any connection can have a variable magnitude given by a weight and centered on a different value given by a bias. The values in the output layer 250 depend on the values in the input layer and the activation functions used at each node and the weights and biases associated with each connection that terminates on that node. The sigmoid activation function (dashed trace) has the properties that values much less than the center value do not contribute to the combination (a so called switch off effect) and large values do not contribute more than the maximum value to the combination (a so called saturation effect), both properties frequently observed in natural neurons. The tanh activation function (solid trace) has similar properties but allows both positive and negative contributions. The softsign activation function (short dash-dot trace) is similar to the tanh function but has much more gradual switch and saturation responses. The rectified linear units (ReLU) activation function (long dash-dot trace) simply ignores negative contributions from nodes on the previous layer, but increases linearly with positive contributions from the nodes on the previous layer; thus, ReLU activation exhibits switching but does not exhibit saturation. In some embodiments, the activation function operates on individual connections before a subsequent operation, such as summation or multiplication; in other embodiments, the activation function operates on the sum or product of the values in the connected nodes. In other embodiments, other activation functions are used, such as kernel convolution.

An advantage of neural networks is that they can be trained to produce a desired output from a given input without knowledge of how the desired output is computed. There are various algorithms known in the art to train the neural network on example inputs with known outputs. Typically, the activation function for each node or layer of nodes is predetermined, and the training determines the weights and biases for each connection. A trained network that provides useful results, e.g., with demonstrated good performance for known results, is then used in operation on new input data not used to train or validate the network.

In some neural networks, the activation functions, weights and biases, are shared for an entire layer. This provides the networks with shift and rotation invariant responses. The hidden layers can also consist of convolutional layers, pooling layers, fully connected layers and normalization layers. The convolutional layer has parameters made up of a set of learnable filters (or kernels), which have a small receptive field. In a pooling layer, the activation functions perform a form of non-linear down-sampling, e.g., producing one node with a single value to represent four nodes in a previous layer. There are several non-linear functions to implement pooling among which max pooling is the most common. A normalization layer simply rescales the values in a layer to lie between a predetermined minimum value and maximum value, e.g., 0 and 1, respectively.

It has been found that neural networks of limited input layer size provide advantages in recognizing concepts in natural language processing. Attention is an artificial intelligence process that gives more weight to one object detected than another, e.g., giving more weights to specific tokens in the input sequence than other tokens based on how semantically-related are the tokens with respect to the word being encoded.

Figure 3A:
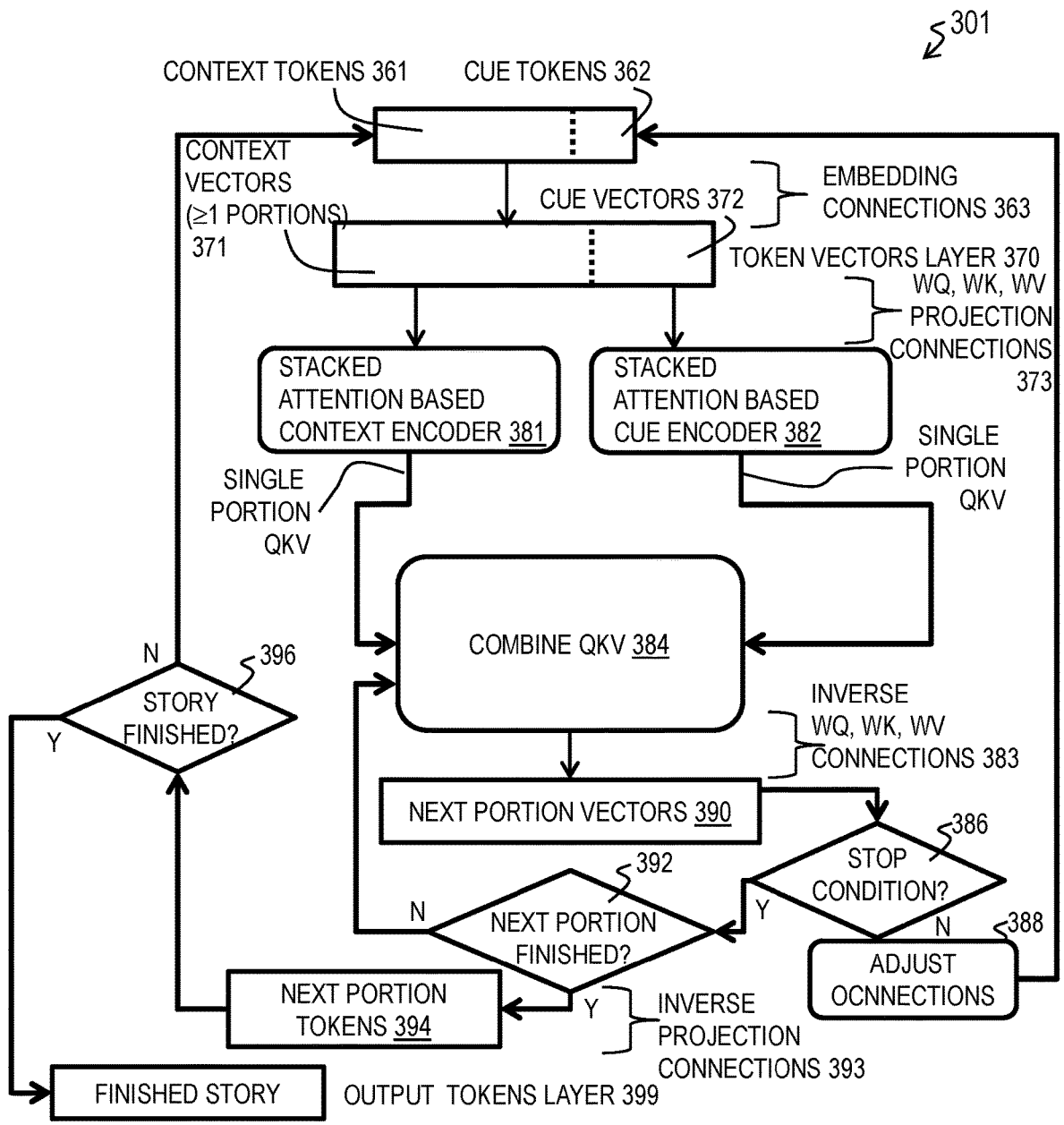
FIG. 3A is a block diagram that illustrates an example flow through several neural networks such as used within a current system, according to an embodiment.

FIG. 3A is a block diagram that illustrates an example flow through several neural networks such as used within a current system, according to an embodiment. The entire flow constitutes an artificial intelligence system 301 made up of one or more neural network subsystems that perform one or more functions as described here. During training the neural network subsystems are adapted to give as closely as possible the results from the training set. The training corpus 110 is divided as describe above into triplets of two inputs, context (X) and cue phrase (c), and one desired result, next portion Y. For purposes of this discussion, the training dataset is represented by D made up of the set of triplets given by Equation 1a, $$D=\{(X_i,Y_i,c_i)\}_{i=0}^{N} \quad (1a)$$

where N is the number of triplets (e.g., the number of story sentences minus 1) $X_i$ is the context (previous sentence(s) of the story), $Y_i$ is the next sentence, and $c_i$ is a sequence of tokens representing the cue phrase for $Y_i$, given by Equation 1b, $$c_i=\{C_{i1},C_{i2},\ldots,C_{ik}\} \quad (1b)$$

where k is the number of tokens in the cue phrase.

To train the neural network(s), for example, entropy is minimized using Equation 1c or $$L_0 = \frac{1}{N}\left[-\sum_{n=1}^{N}\sum_{j=1}^{m}P(Y_{i,j}\mid X_i,c_i,\theta)\right] \quad (1c)$$

$$L_0 = -\sum_{i=1}^{M}\log P(Y_{i,j}\mid X_i,c_i,\theta) \quad (1d)$$

where $L_0$ is cross-entropy loss, θ represents model parameters, e.g., weight matrices WQ, WK, WV, m is the length of the next sentence in number of tokens, and the index j refers to the next token in the next sentence indicated by index i. Note that these models are being trained to generate a story one sentence at a time in a pipeline fashion, e.g., when generating the ith sentence, the model takes the first i−1 sentences in the story as the context (X) along with the user-provided cue phrase (c).

During operation, after training, the context (X) and cued phrase (c) are provided for each new portion, and, as a result, the next portion (Y) is generated and added to the context.

The input to the system 310 includes context tokens 361 and cue tokens 362. The maximum number of tokens for each portion, Mp, is predetermined, e.g., 50 tokens per sentence in the example embodiment described below. The context grows with time and so the context is limited by the maximum number of tokens per portion Mp times one less than the maximum number of portions Ms in a story, which is Ms-1. For example, if each token has an identifier represented by the value of one node, then the input layer is made up of (Ms-1)*Mp context nodes. If the network is set up for up to Mc tokens per cue phrase, then the total number of inputs is (Ms-1)*(Mp+Mc) nodes For the example described below, the context input is limited to Ms=4 input sentences times Mp=50 tokens per sentence, which is 300 tokens. Although these parameters were predetermined in the illustrated embodiment, in other embodiments any other method may be used to determine the maximum number of tokens per portion and the maximum number of portions per story.

A neural network with embedding connections 363 converts the identifiers for the context tokens 361 to context vectors 371 for one or more portions and converts the identifiers for the cue phrase tokens to cue vectors 372. By converting each token to a T element vector, the output of the embedding layer is made up of T*(Ms-1)*(Mp+Mc) nodes, with one or more predetermined hidden layers, and with embedding connections 363 developed during training.

A neural network with projection connections 373 converts the T dimensional vectors to smaller dimensional vectors for both context vectors 371 and cue vectors 372. For example, if NQ=NK=NV=N, then the output layer of the is made up of 3*N*Mp*Ms nodes, with one or more predetermined hidden layers, and with projection connections 373 developed during training. As a result, the context is made up of ds≤Mp*(Ms-1) vectors for each of Q, K and V vector types, called a set of Q/K/V context vectors; and, the cue phrase is made up of a different set of up to dc≤Mc*(Ms-1) vectors for each of Q, K and V vector types, called a set of Q/K/V cue vectors.

Figure 4A:
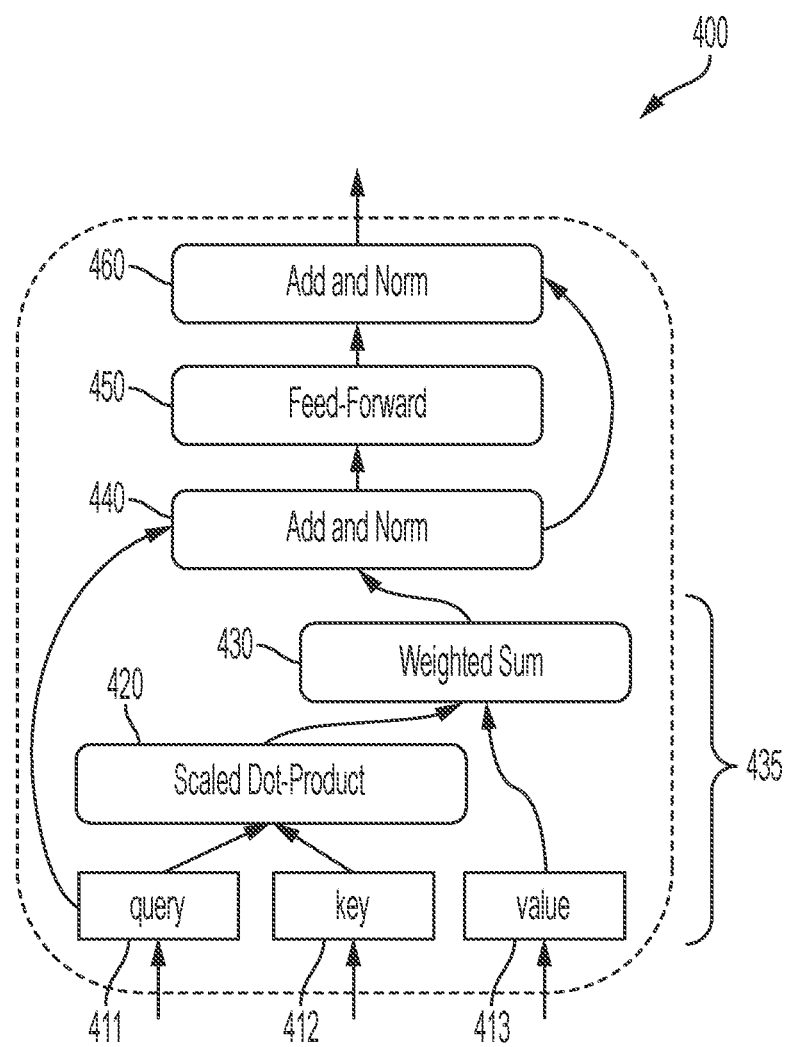
FIG. 4A is block diagram that illustrates example functions of an attention module, according to an embodiment.

In the stacked attention based context encoder 381 a weighted sum of the set of Q, K and V vectors for the context is performed to produce one set of Q, K and V vectors that pays attention to some aspect of semantics of the context. That is, the information in at least one of the Q/K/V projections is used to draw attention to certain semantics represented by one or more of the remaining projections. Any stacked attention-based encoder may be used. In the illustrated embodiment, an attention module, which is similar to that used in Vaswani et al. (2017), is used and depicted in FIG. 4A through FIG. 4D. FIG. 4A is block diagram that illustrates an example attention encoder 400 that replaces encoder 381, according to an embodiment. The encoder tries to find a simplified representation of the input data. In this encoder, each token, broken up into its three projections Q 411, K 412 and V 413 in the query sequence 411 is involved and the encoder attends to tokens in the key sequence 412. A attention module 435 uses a scaled dot product to produce scores in sub-module 420 based on Q 411 and K 412. The score for each token in the key sequence is then multiplied, in sub-module 430, by the corresponding value vector V 413 to form a weighted sum given by Equation 2, where d=ds.

$$Attn(Q,K,V) = \text{softmax}\left(\frac{Q\cdot K_T}{\sqrt{d}}\right)\cdot V \quad (2)$$

In the remainder of the encoder, the one token that has the greatest weighted sum, Attn(Q,K,V), is selected to represent the context (or the cue) output by the encoder 400.

Figure 4B:
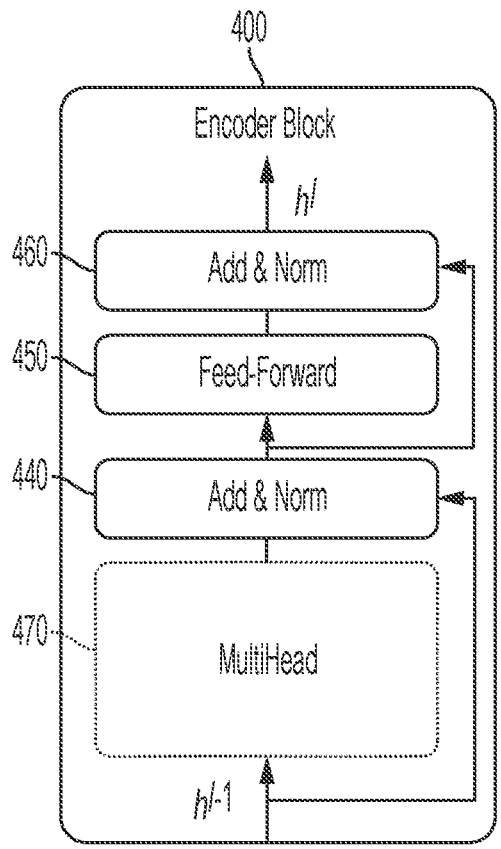
FIG. 4B through FIG. 4D are block diagrams that illustrate example structures of a neural network that accomplish the functions of FIG. 4A, according to an embodiment.
Figure 4C:
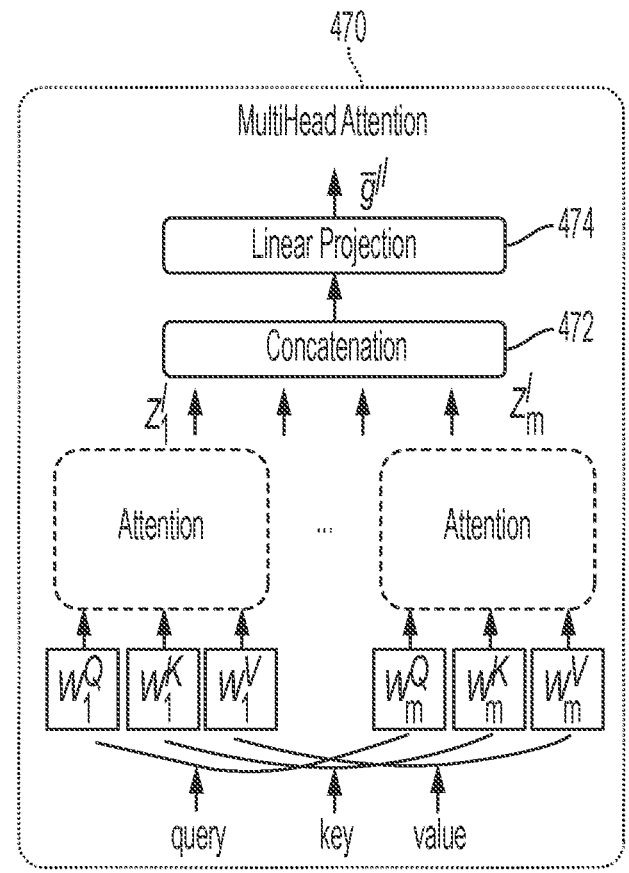
Figure 4D:
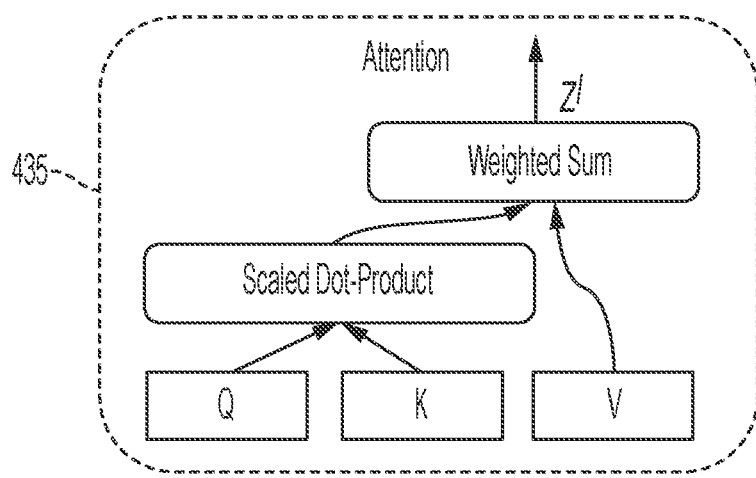

FIG. 4B through FIG. 4C are block diagrams that illustrate example structures of a neural network that accomplish the functions of FIG. 4A, according to an embodiment. An attention module 435 network is depicted in FIG. 4D. The attention modules 435 are staked to process the three projections of each token in the context (or que) in the multi-head attention network 470 depicted in FIG. 4C, including a concatenation network 472 and a linear projection network 474. Thus, the set of Q/K/V values for the context (or the cue) is converted to a single triplet of attention-based Q/K/V vectors for the context (or the cue). This output is fed forward to the other modules 440, 450 and 460 to complete the encoder 400, as depicted in FIG. 4B.

The approach implemented to select the representative token here is to keep the values intact for the word(s) to be focused on; and, drown-out irrelevant words. A multi-head attention is deployed in some embodiments, which allows the model to jointly attend to information from different representation sub-spaces at different positions. So, the attention module includes a layer normalization (Ba et al., 2016) applied in module 440 on the new joint representation obtained by Equation 2. In order to further process the fused representation, a feed-forward neural network (FFN) 450 with ReLU activation (LeCun et al., 2015) is applied to the normalization result. The output of FFN is then residually added to multi-head attention result in module 460. The Encoder block 400 thus includes a self-attention module (420 and 430 and 440) and an FFN 450. The operation of the attention module implementing Equation 2 and the other networks of FIG. 4A through FIG. 4D is given by Expression 3.

$$\text{EncBlock}(Q,K,V) \quad (3)$$

Similarly, the smaller set of Q/K/V vectors for the cue phrase is converted to a single triplet of attention-based Q/K/V vectors for the cue phrase alone, in stacked attention-based cue encoder 382, that applies Equation 2 with d=dc.

As depicted in FIG. 4A through FIG. 4D, the scaled dot multiply and weighted sum are hard wired; but other connections, e.g., the addition and normalization networks 440 and 460 or the feed forward network 450, or some combination, are learned during training.

Figure 5A:
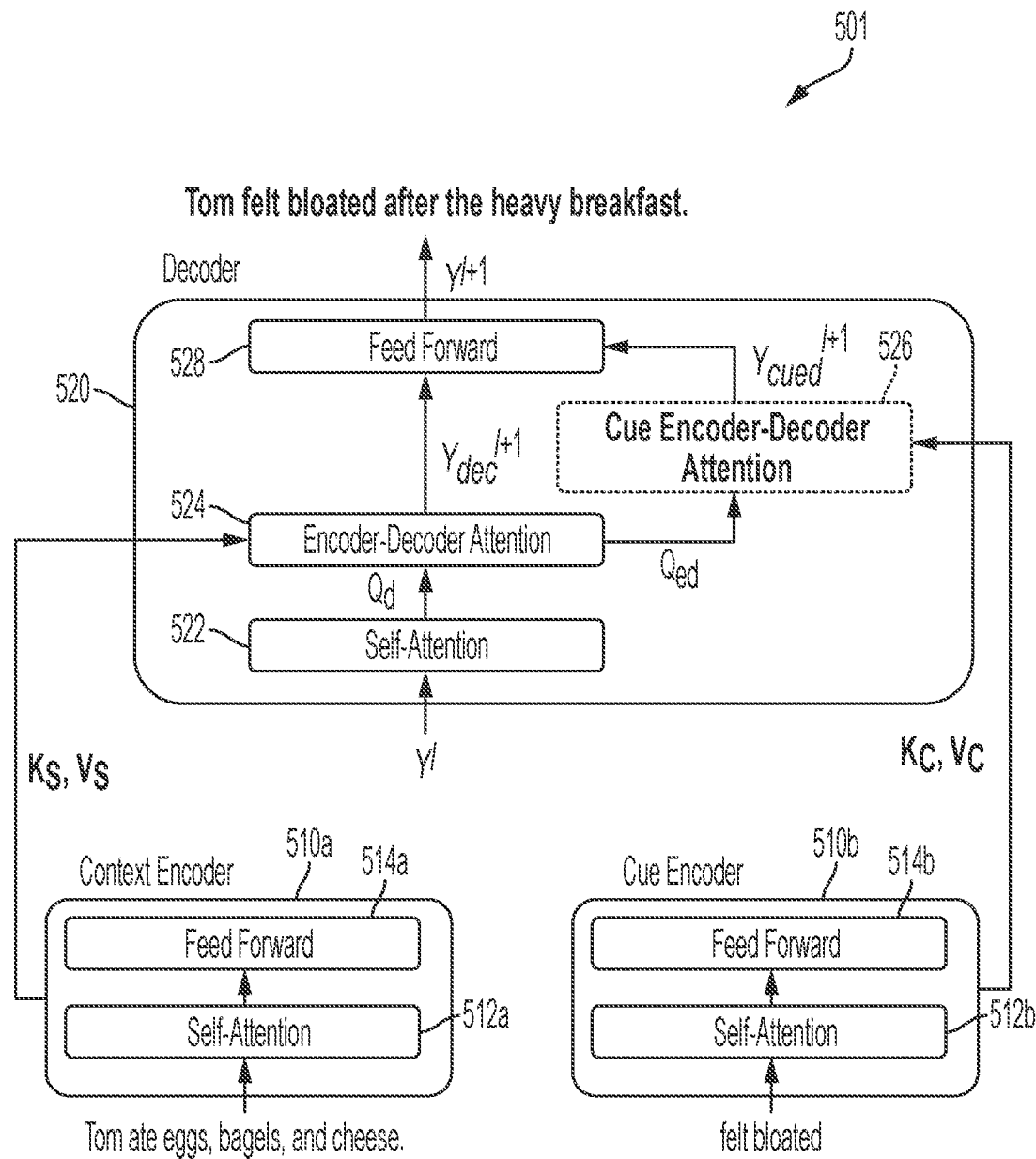
FIG. 5A and FIG. 5B are block diagrams that each illustrates example combiner/decoder modules for a Cue-Aware story writer, according to an embodiment.
Figure 5B:
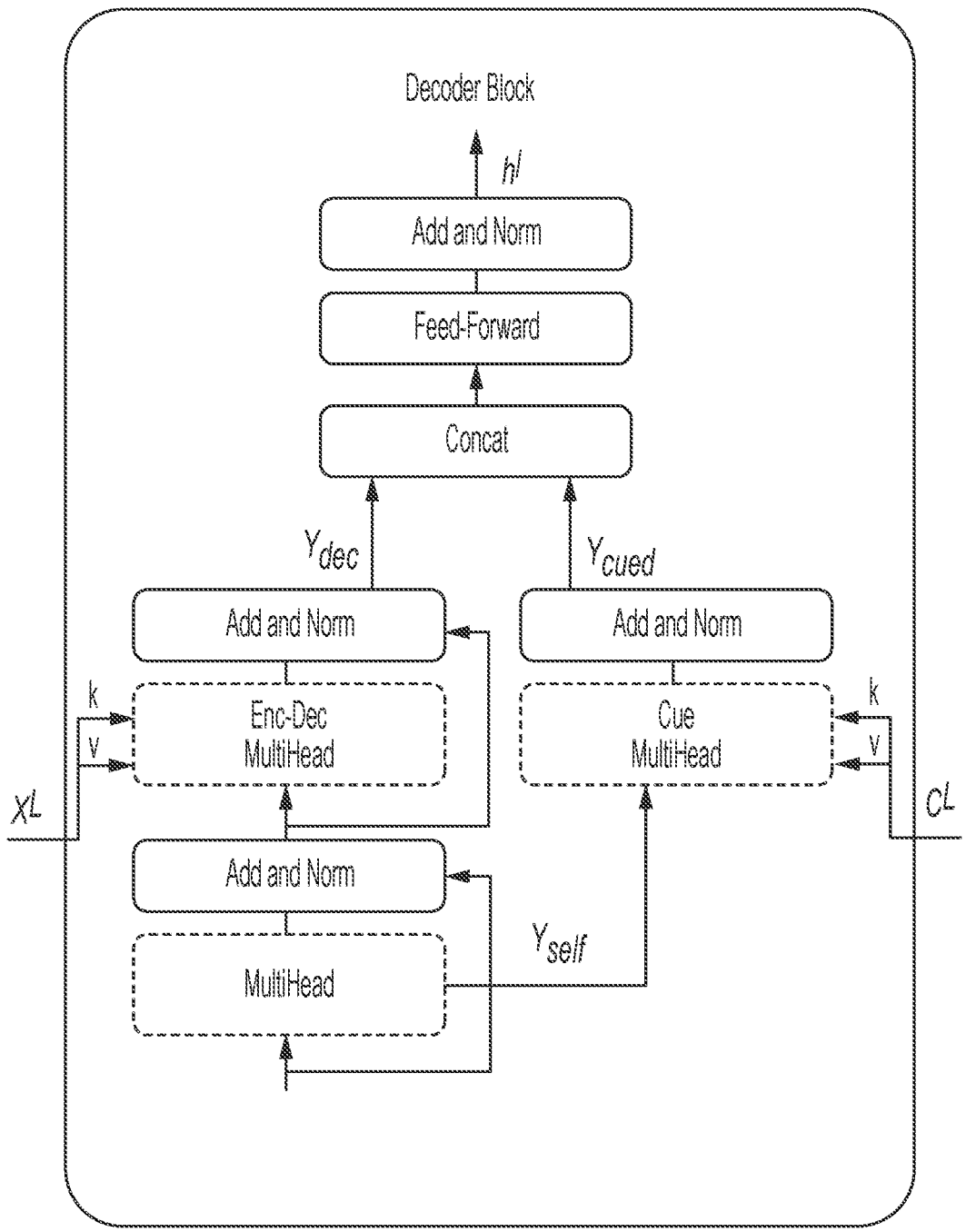

Returning to FIG. 3A, the Q/K/V triplet from the context is combined with the Q/K/V triplet from the cue phrase in combiner module 384. In various embodiments, any combiner module may be used. In the illustrated example, two alternative combiner modules are used, as depicted in FIG. 5A and FIG. 5B, called Cue-Aware story writer and Relevance Cue-Aware story writer, respectively, and described in more detail below. The Q/K/V triplet for Y is converted to a T-dimensional vector in self-attention layer and encoder-decoder attention layers of the decoder depicted in FIG. 5A or FIG. 5B and represented in FIG. 3A by inverse WQ, WK and WV connections 383. The connections in these layers, and in the feed forward layer of the decoder, are learned during training.

Returning to FIG. 3A, the output of the Q/K/V combiner 384 is the vector for the next token 390 for the next portion. In some embodiments, during training, as determined during step 386, this vector is compared to the vector for the next token in the next portion of the training set and the difference, if any, is accumulated e.g., for the calculation of the entropy in Equation 1c or Equation 1d. In step 388, adjustments are made to the connections subject to training, for example using any of several known methods for training neural networks. The adjustment is chosen to reduce entropy of the system. After the adjustments are made, control passes back to continue the operation or to restart the operation with the token values 361 and 362 as depicted in FIG. 3A. In some embodiments, the check is not made in the middle of the next portion; but, instead, is made after the entire new portion is produced as determined in step 392, described below.

The goal during training is to learn values for the network parameters (e.g., WQ, WK and WV, among other connections) that minimize the entropy. A standard approach is to reduce entropy in each of several iterations to approach an entropy minimum. In each iteration, the parameters are changed in a manner that is guaranteed to reduce entropy (but not necessarily minimize it). Since the decrease in entropy is mathematically guaranteed, after every step, there is no need to check if that step indeed reduces the entropy or even to compute the entropy using Equation 1. This helps avoid unnecessary calculations; and, step 386 can be omitted, even during training. Usually, the stop condition is achieved by doing the iterative entropy reduction for a pre-determined number of times. Theoretically, there is a chance that entropy hasn't been minimized (attained as small as value as possible or even approached to a specific level of tolerance); but in practice it has been found that after you do this training process for sufficient number of iterations the model performs well in practice. Thus, there is diminishing benefit to performing additional training iterations.

If step 386 is skipped (e.g., after training), or step 386 is moved to step 392, or after the training stop condition, control passes to step 392. In step 392 it is determined if the next portion has been finished, i.e., no new vectors are to be added to the next portion. If not finished, then the vector is passed back to the QKV combiner 384 to project the next portion back into its short sequence of Q/K/V projections and mix with the context again to produce the next token for the next portion.

If it is determined in step 392 that the next portion is finished, then the result is the matrix of vectors for the next portion which are converted to tokens and stored in register 394. This involves decoding using the inverse of the projection connections. If the story is finished, then a newly finished story occupies the output tokens layer 399; and, those tokens are presented or stored on a computer-readable medium. If the story is not finished, the tokens of the next portion are added to the tokens of the context 361, as depicted in FIG. 3A. Alternatively, or in addition, the T-dimensional vectors of the next portion are added to the matrix 131 of T-dimensional context vectors 371.

Figure 3B:
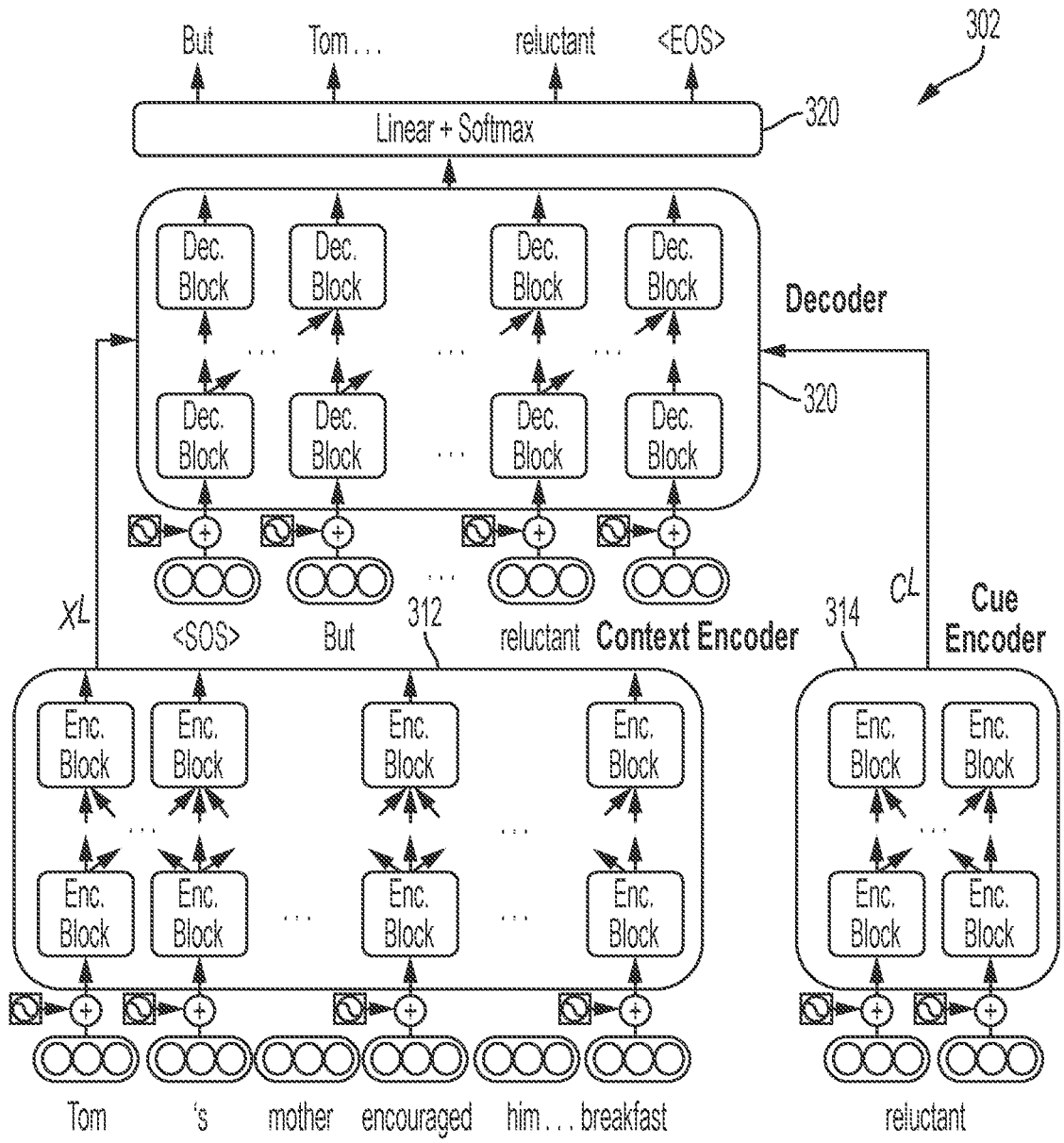
FIG. 3B is a block diagram that illustrates an example overall neural network architecture that accomplishes the flow of FIG. 3A, according to an embodiment.

The functions depicted in FIG. 3A are implemented as the neural network system depicted in FIG. 3B. FIG. 3B is a block diagram that illustrates an example overall neural network architecture 302 that accomplishes the flow of FIG. 3A, according to an embodiment. In the rest of this section, we describe our two novel content-inducing approaches for addressing the interactive story generation task: the Cued Writer, and the Relevance Cued Writer. These models share an identical overall encoder-decoder based architecture shown in FIG. 3B. They adopt a dual encoding approach where two separate but architecturally similar encoders 312 and 314 are used for the context (Context Encoder) and the cue phrase (Cue Encoder), respectively. Both these encoders advise the combiner/decoder (henceforth described simply as Decoder 320), which in turn generates the next sentence. The two proposed models use the same encoding mechanism depicted in FIG. $A through FIG. 4D and differ only in their decoders 320.

As mentioned above, two structures to implement the combiner 384 and inverse connections 383 (called combiner/decoder) are considered in various embodiments, represented in FIG. 5A and FIG. 5B, respectively. In both these diagrams, it is assumed that the input is embedded vectors for all the input tokens (context with subscript S (corresponding to X above) and cue with subscript C (corresponding to c above) and the output embedded vectors of the next portion tokens, which are subsequently unembedded to produce output tokens for the next portion. To this end, each structure uses two separate encoders 312 and 314, respectively, one for the context and a separate one for the cue phrase.

FIG. 5A and FIG. 5B are block diagrams that each illustrates example combiner/decoder modules 520 for a Cue-Aware story writer system 501, according to an embodiment. In this design, cue phrases provide an indication of user's expectation of what they want to see in the next sentence of the story, so the cue phrase is used by the system at the time of generation, i.e. in the decoder 320, and both these encoders advise the decoder which in turn generates the next sentence. In the system 501, the context encoder 510a and the cue encoder 510b are composed of a stack of identical attention modules, as described in FIG. 4B. Each module 510 has two sublayers: self-attention network 512 and position-wise feed-forward network 514. The self-attention modules 512a, 512b, respectively, correspond to attention module 435 where the Q/K/V projections are from the same embedded vector. Each encoder also has a feed-forward module 514a, 514b, respectively, corresponding to modules 440 and 450 and 460.

Given $S^0$ and $C^0$ as the initial word-level embedding representations for the context and the cue phrase respectively, with the superscript indicating the number of layers in the attention module in the range [0, L], where L is the number of node layers in the attention module neural network. The new representations are constructed through stacks of Attention Modules as given by Equations 4a and 4b.

$$S^{l+1}=\text{EncBlock}(QS^l, KS^l, VS^l) \tag{4a}$$

$$C^{l+1}=\text{EncBlock}(QC^l, KC^l, VC^l) \tag{4b}$$

Note that Equations 4a and 4b represent self-attention where each key, value and query comes from the same token. The goal of this self-attention module is to produce a representation for the input token sequence.

The output of context encoder 510a is the single projection triplet $Q_S/K_S/V_S$ that indicates a focus of the context. The $K_S$ and $V_S$ projections are input to combiner/decoder 520. Similarly, the output of cue encoder 510b is the single projection triplet $Q_C/K_C/V_C$ that indicates a focus of the cue phrase. The $K_C$ and $V_C$ projections are also input to combiner/decoder 520.

Specifically, as shown in FIG. 5A, after processing the two types of inputs in the Context and Cue encoders, 510a and 510b, respectively, the system includes their encoded representations in the decoder 520 via the Encoder-Decoder Attention module 524 and the Cue-Encoder-Decoder attention module 526, respectively. They help the decoder in focusing on the relevant part of the context and the cue phrase, respectively, when processing the next word $Y^{l+1}$ of the output sentence based on the previous word $Y^l$. Given $Y^0$ as the word-level embedding representation for the next sentence, these Decoder Attention Modules of combiner/decoder 520 are formulated as given by Equations 5a through 5d.

$$Y_{self}^{l+1}=\text{Attn}(QY^l, KY^l, VY^l) \tag{5a}$$

$$Y_{dec}^{l+1}=\text{Attn}(QY_{self}^{l+1}, KS^{L-1}, VS^{L-1}) \tag{5b}$$

$$Y_{cued}^{l+1}=\text{Attn}(QY_{dec}^{l+1}, KC^{L-1}, VC^{L-1}) \tag{5c}$$

$$Y^{l+1}=\text{FFN}(Y_{dec}^{l+1}, Y_{cued}^{l+1}) \tag{5d}$$

Equation 5a is implemented in module 522 as the standard self-attention which measures the intra-sentence agreement for the output sentence, given the current population of the output sentence with l words. Equation 5b is implemented in module 524 and measures the agreement between context and next sentence, where queries come from the decoder self-attention layer (Qd) and the keys and values come from the context encoder ($K_S$ and $V_S$). The agreement with the cue phrase is captured by another attention module 526. Here the queries Qed come from the encoder-decoder attention module 524 and the keys and values come from the Cue encoder ($K_C$ and $V_C$). Lastly, the semantic representations from both $Y_{dec}$ and $Y_{cued}$ are combined using an FFN 528 that implements Equation 5d. The FFN is given by Equation 6.

$$FFN(x_1, x_2)=\max(0, x_1 W_1 + x_2 W_2) W_3 \tag{6}$$

where $x_1$ and $x_2$ are 2D-vectors in the same shape of a query vector Q; and $W_1$, $W_2$ and $W_3$ are learned parameters. In Equation 5d, $x_1$ and $x_2$ map to $Y_{dec}$ and $Y_{cued}$, respectively.

Alternative details are depicted in FIG. 5B, which shows a similar flow but uses the X, c, Y terminology and is more specific about the use of multihead attention modules, addition and normalization modules, and concatenation of multiple outputs before certain feed forward networks.

The Cue-Aware Story Writer described above makes the decoder aware of the cue phrase; but, it does not capture the relevance of the cue phrase to the context. The Relevance Cue-Aware story writer, described next, also takes into account how related the cue phrase is to the context.

Figure 5C:
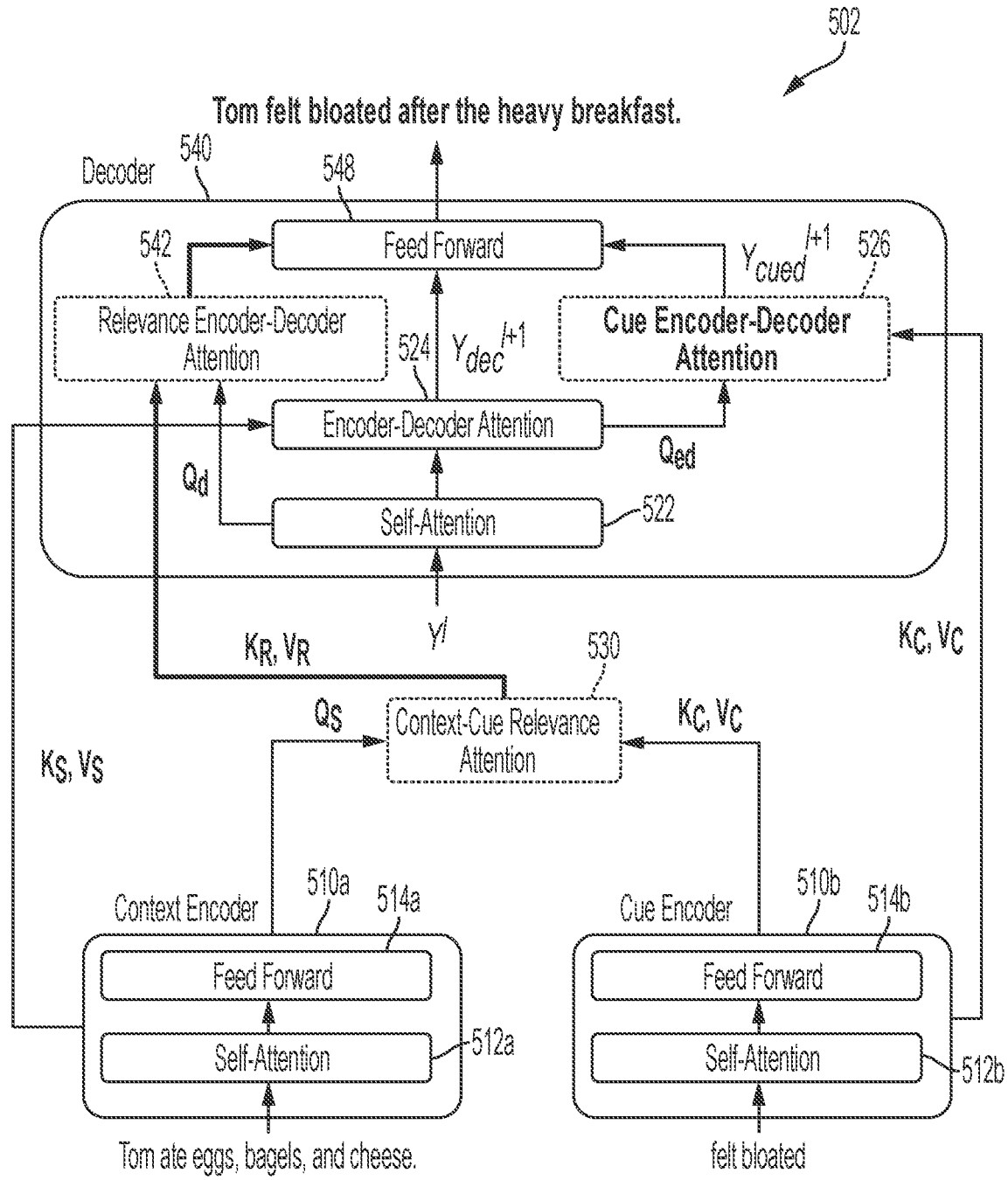
FIG. 5C and FIG. 5D are block diagrams that each illustrates example combiner/decoder modules for a Relevance Cue-Aware story writer, according to an embodiment.
Figure 5D:
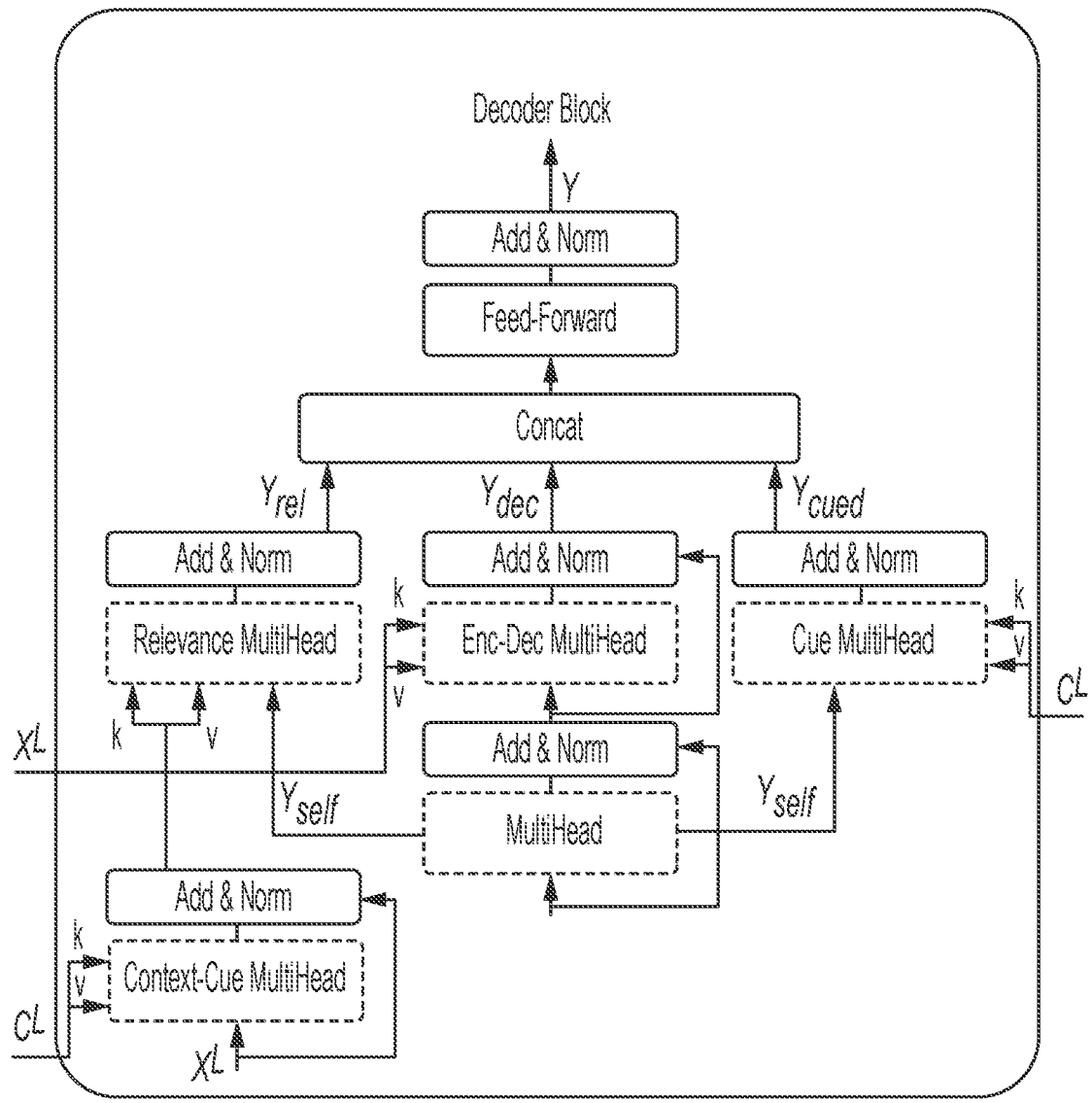

FIG. 5C and FIG. 5D are block diagrams that each illustrates example combiner/decoder modules 540 for a Relevance Cue-Aware story writer system 502, according to an embodiment. The context encoder 510a and the cue encoder 510b and modules 522, 524, 526 and 528 are as described above for FIG. 5A. The system 502 of FIG. 5B is similar to the Cue-Aware Story Writer system 501 of FIG. 5A except that it has two additional units: the Context-Cue Relevance Attention module 530; and the Relevance Encoder-Decoder Attention module 542. In addition, the combiner/decoder 540 includes a three way FFN 548 instead of the two way FFN 528. The design of the Context-Cue Relevance Attention system 502 is to characterize the relevance between the context and the cue phrase so as to weaken the effect of words in the cue phrase that are irrelevant to the context and highlight the importance of more relevant cue words.

The new modules 530, 542 and 548 implement Equation 7a, Equation 7b and Equation 8, respectively.

$$S_R^{l+1}=\text{Attn}(QS^{L-1}, KC^{L-1}, VC^{L-1}) \tag{7a}$$

$$Y_{rel}^{l+1}=\text{Attn}(QY_{self}^{l+1}, KS_R^{l+1}, VS_R^{l+1}) \tag{7b}$$

$$Y^{l+1}=\text{FFN3}(Y_{dec}^{l+1}, Y_{cued}^{l+1}, Y_{rel}^{l+1}) \tag{8}$$

This three-argument feed forward network, FFN3, is given by Equation 9.

$$FFN3(x_1, x_2, x_3)=\max(0, x_1 W_1 + x_2 W_2 + x_3 W_3) W_4 \tag{9}$$

where $W_1$, $W_2$, $W_3$ and $W_4$ are learned parameters.

Alternative details are depicted in FIG. 5D, which shows a similar flow but uses the X, c, Y terminology and is more specific about the use of multihead attention modules, addition and normalization modules and concatenation of multiple outputs before certain feed forward networks.

Although processes, equipment, and data structures are depicted above as integral blocks in a particular arrangement for purposes of illustration, in other embodiments one or more processes or data structures, or portions thereof, are arranged in a different manner, on the same or different hosts, in one or more databases, or are omitted, or one or more different processes or data structures are included on the same or different hosts.

2. Example Embodiments

According to an example embodiment for five sentence stories, stacked attention-based encoders are used for the context and combined with attention-based encoder for the cued text in an attention-based decoder to produce an output that performs better than previous approaches to artificial intelligence story generation. In this example embodiment, the neural network is trained on five-sentence stories, cued input is introduced after each sentence, and sentences are limited to 50 words. The embedding is done with 512 element vectors, and the training set comprises 88,344 stories, which involves 353,376 training pairs of context and next portion.

Both versions of the combiner/decoder performs as well as or better than previous approaches and the relevance cue-aware combiner/decoder performs the best of all.

The ROCStories corpus (Mostafazadeh et al., 2016) were used for experiments. It contains 98,161 five-sentence long commonsense stories. This corpus has a rich set of causal/temporal sequence of daily events which serves as a good choice for the story generation task. 5% of stories were held out for validation and 5% for a test set.

To evaluate the performance of the proposed systems, their results were compares against following baselines.
•S2SA (RNN-based baseline), which is based on an LSTM sentence-to-sentence generator with attention (Bahdanau et al., 2014). In order to incorporate user-provided cue phrases, we concatenate context and cue phrase with a delimiter token (<$>) before passing it to the encoder of the LSTM.
•Vanilla-Trans To incorporate content-introducing approaches, a Transformer network was set up as a baseline, called Vanilla-Trans. Like before, context and cue phrase were concatenated using a delimiter token (<$>) before passing it to the encoder of the Transformer.

For the story generation task, a maximum length was set of 50 words per sentence. Following previous work (Vaswani et al., 2017), a 6-layer encoder-decoder transformer was trained with self-attention heads (512 dimensional states and 8 attention heads). The example networks contained a 2-layer encoder for encoding cue phrase (all other specifications are the same). For the position-wise feed-forward networks, 2048 dimensional inner states were used. The Adam optimizer (Kingma and Ba, 2014) was used for learning with a learning rate of $10^{-4}$ and residual, embedding, and attention dropouts with a rate of 0.1 for regularization. All models are implemented in Pytorch and trained for 30 epochs.

For training the systems, not only are sentence pairs used, but also cue phrases are used which are expected to be entered by a human user. However, to scale the training process for the thousands of pairs useful for good results, an automated way of generating cue phrases relevant to the training sentences is beneficial. In order to accomplish this cue phrases were automatically extracted using a previously proposed RAKE algorithm for extracting key phrases from a sentence (Rose et al., 2010). It is important to note that in principle, cue phrases can represent a variety of information, and many other methods can be used to extract them for use with training sets. For example, one could use topic words, or distinctive entities or noun phrases in the sentence, or the head word in the dependency parse of the sentence, among others.

Following previous works (Martin et al., 2018; Fan et al., 2018), various models were compared using model Perplexity and BLEU score on the test set. Table 1 shows the results.

TABLE 1

Automatic evaluation results showing better performance than baseline stories.

| System | Perplexity | BLEU-4(%) | Local Contextuality |
|---|---|---|---|
| S2SA | 7.684 | 4.17 | 0.229 |
| Vanilla-Trans | 4.251 | 29.21 | 0.197 |
| Cue-aware | 3.957 | 31.32 | 0.206 |
| Relevant-Cue aware | 3.930 | 32.72 | 0.202 |

It can be seen in Table 1 that both the proposed models in the last two lines outperform the baselines in the top two lines for these measures. Specifically, the Relevance Cue-Aware Story Writer supersedes the strongest baseline, Vanilla-Trans, by scores of 0.321 and 3.51 in perplexity and BLEU-4, respectively. Between the two cue-aware systems, Relevance Cue-Aware Story Writer performs better than the Cue-Aware Story Writer.

A major limitation of both Perplexity and BLEU is that these scores evaluate a model on its ability to reproduce a given corpus; and, thus, are not a good way to evaluate models that can generate novel outputs that do not appear in the test set. To overcome this, the models were also evaluated using Local Contextuality (Purdy et al., 2018) that measures the semantic relevance of sentences in the context of their adjacent sentences using sentence embeddings. The last column of Table 1 shows such results for these the cue-aware systems. This happens probably because S2SA generates more repetitive content (also shown in the next experiments), which helps in yielding better Local Contextuality scores. However, it can be seen that the cue-aware systems outperform the other baseline, Vanilla-Trans.

Figure 6A:
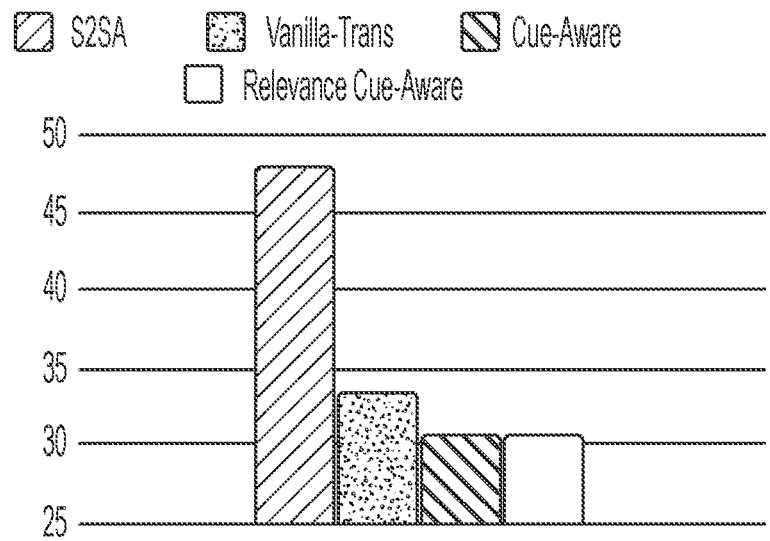
FIG. 6A is a bar graph that illustrates example inter-story aggregate repetition score comparisons, according to embodiments.
Figure 6B:
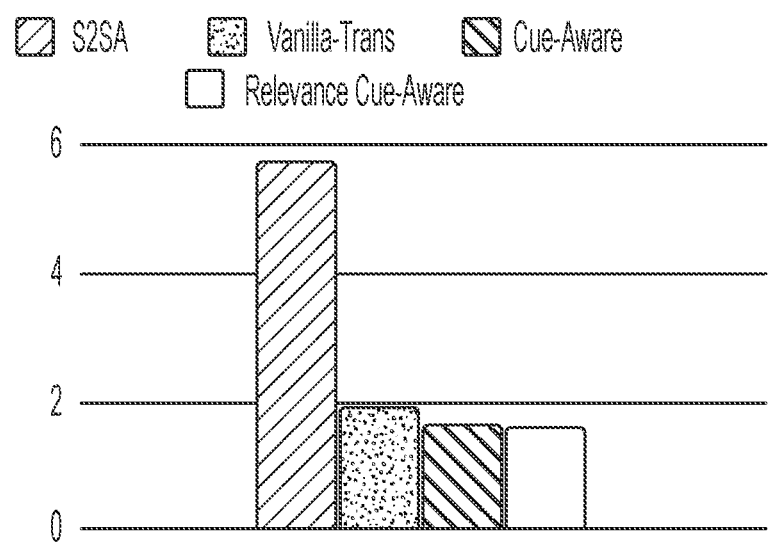
FIG. 6B is a bar graph that illustrates example intra-story aggregate repetition score comparisons, according to embodiments.

It has been shown that neural network systems are prone to generating repetitive content. To evaluate this aspect, inter-story and intra-story aggregate repetition scores (proposed in Yao et al. (2019)) were used to quantify diversity across the generated stories. A lower value is better for these scores. FIG. 6A is a bar graph that illustrates example inter-story aggregate repetition score comparisons, according to embodiments. FIG. 6B is a bar graph that illustrates example intra-story aggregate repetition score comparisons, according to embodiments. For both graphs, smaller values are more desirable. As shown in FIG. 6A and FIG. 6B, S2SA has a very high score indicating that it generates repetitive content. The other three systems have much lower scores. Note that both the Cue-Aware and Relevance Cue-Aware Story Writer systems have almost similar performance for this measure; but, even so, both of them have lower scores as compared to the baselines.

The two cue-aware systems are also compared with that of Yao et al. (2019) as shown in Table 2.

TABLE 2

Superior performance compared to Yao story generation system.

| System | BLEU-4 (%) |
|---|---|
| Plan-and-Write (Dynamic) | 2.62 |
| Plan-and-Write (Static) | 3.44 |
| Cue-aware | 31.32 |
| Relevant-Cue aware | 32.72 |

It is reiterated that these models are not directly comparable because they address different problems. Nevertheless, comparing test BLEU scores with the results reported by Yao et al. (2019) on the same corpus, one can see that the cue-aware systems get better scores. It is surmised that this improvement may be because the cue-aware system embodiments are based on the Transformer network, which is considered to be better at modeling context than RNNs. Another reason for the improved performance is expected to be that the information about cue phrases is infused in the decoding phase in the cue-aware systems.

Although automatic evaluation can be indicative of the quality of generated story to some extent, it cannot evaluate all aspects of the creative story generation task. To this end, the cue-aware systems were further evaluated by asking a human to judge the quality of their outputs. Specifically, pairwise comparisons were conducted of results generated from various models on Amazon Mechanical Turk. Two types of experiments were conducted. Sentence level evaluation and story level evaluation.

In sentence level evaluation, the goal is to evaluate the goodness of the generated sentences while the system is in the middle of generating a story. Specifically, to compare two models, a (incomplete) story passage was provided, and a manually provided cue phrase was provided, to the two systems. The output sentences were shown to human judges. These sentences are the system outputs for the continuation of the input story. The judges are asked to identify which of the two sentences is better based on their grammaticality and relevance to (1) the input story and (2) the cue phrase. This experiment was performed for a set of 100 sentences. Each sentence was evaluated by at least 3 judges. The results of this experiment are shown in the first row of Table 3.

TABLE 3

Human evaluation results showing superior performance of cue-aware systems by percentage choosing a superior result in a head-on-head comparison

|  | Cue-Aware vs Rel. Cue Aware | | Vanilla-Trans vs Rel. Cue Aware | |
| --- | --- | --- | --- | --- |
| Percentage chosen | Cue-Aware | Rel. Cue Aware | Vanilla-Trans | Rel. Cue Aware |
| Sentence level | 39% | 61% | 37% | 63% |
| Story level | 46% | 54% | 43% | 57% |

Comparing the two cue-aware systems, one can see that the judges chose the sentences generated by the Relevance Cue-Aware Story Writer 61% of the time, indicating that it generates better sentences than Cue-Aware Story Writer. In another experiment, the sentences generated by the Relevance Cue-Aware story writer were compared with Vanilla-Trans—the stronger baseline as determined by automatic evaluation. One can that the sentences of the Relevance Cue-Aware story writer was preferred over the baseline 63% of the time.

In story level evaluation, the human judges are asked to evaluate the entire stories (instead of individual sentences) produced by the systems. In this experiment, the systems are provided with the first sentence (prompt) of a randomly selected story from the test set and 4 manually-chosen cue phrases to generate the entire story. The two generated stories are shown to judges and they are asked to choose the better one based on grammar and coherence. These results are shown in the second row of Table 3. One can see that the judges preferred the stories generated by Relevance Cue-Aware Story Writer over those generated by Cue-Aware Story Writer 54% of the time. These results demonstrate the effectiveness of the added Context-Cue Relevance Attention module 530 and Relevance Encoder-Decoder Attention module 542. Like before, Relevance Cue-Aware Story Writer is also compared with the stronger baseline, Vanilla-Trans. One can see from Table 3 that the judges preferred stories from the Relevance Cue-Aware Story Writer over the baseline 57% of the time. In summary, these experiments indicate that the cue-aware systems are better than the baselines in generating more coherent stories.

3. Computational Hardware Overview

Figure 7:
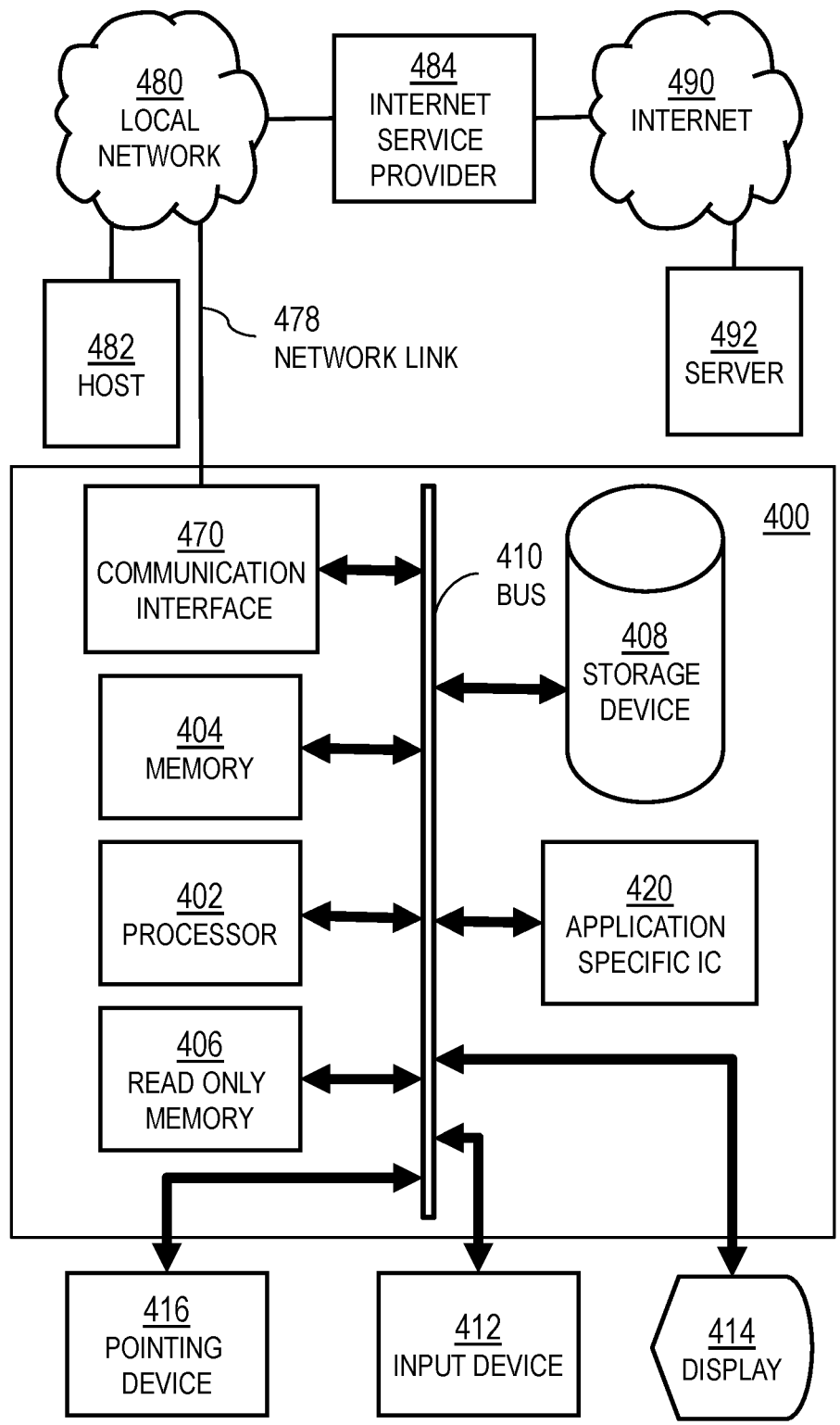
FIG. 7 is a block diagram that illustrates a computer system 400 upon which an embodiment of the invention may be implemented.

FIG. 7 is a block diagram that illustrates a computer system 700 upon which an embodiment of the invention may be implemented. Computer system 700 includes a communication mechanism such as a bus 710 for passing information between other internal and external components of the computer system 700. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of one or more methods described herein.

A sequence of binary digits constitutes digital data that is used to represent a number or code for a character. A bus 710 includes many parallel conductors of information so that information is transferred quickly among devices coupled to the bus 710. One or more processors 702 for processing information are coupled with the bus 710. A processor 702 performs a set of operations on information. The set of operations include bringing information in from the bus 710 and placing information on the bus 710. The set of operations also typically include comparing two or more units of information, shifting positions of units of information, and combining two or more units of information, such as by addition or multiplication. A sequence of operations to be executed by the processor 702 constitutes computer instructions.

Computer system 700 also includes a memory 704 coupled to bus 710. The memory 704, such as a random access memory (RAM) or other dynamic storage device, stores information including computer instructions. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of computer instructions. The computer system 700 also includes a read only memory (ROM) 706 or other static storage device coupled to the bus 710 for storing static information, including instructions, that is not changed by the computer system 700. Also coupled to bus 710 is a non-volatile (persistent) storage device 708, such as a magnetic disk or optical disk, for storing information, including instructions, that persists even when the computer system 700 is turned off or otherwise loses power.

Information, including instructions, is provided to the bus 710 for use by the processor from an external input device 712, such as a keyboard containing alphanumeric keys operated by a human user, or a sensor. A sensor detects conditions in its vicinity and transforms those detections into signals compatible with the signals used to represent information in computer system 700. Other external devices coupled to bus 710, used primarily for interacting with humans, include a display device 714, such as a cathode ray tube (CRT) or a liquid crystal display (LCD), for presenting images, and a pointing device 716, such as a mouse or a trackball or cursor direction keys, for controlling a position of a small cursor image presented on the display 714 and issuing commands associated with graphical elements presented on the display 714.

In the illustrated embodiment, special purpose hardware, such as an application specific integrated circuit (IC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 770 sends and receives electrical, acoustic or electromagnetic signals, including infrared and optical signals, that carry information streams, such as digital data.

The term computer-readable medium is used herein to refer to any medium that participates in providing information to processor 702, including instructions for execution. Such a medium may take many forms, including, but not limited to, non-volatile media, volatile media and transmission media. Non-volatile media include, for example, optical or magnetic disks, such as storage device 708. Volatile media include, for example, dynamic memory 704. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 702, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 702, except for carrier waves and other signals.

Logic encoded in one or more tangible media includes one or both of processor instructions on a computer-readable storage media and special purpose hardware, such as ASIC*420.

Network link 778 typically provides information communication through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790. A computer called a server 792 connected to the Internet provides a service in response to information received over the Internet. For example, server 792 provides information representing video data for presentation at display 714.

The invention is related to the use of computer system 700 for implementing the techniques described herein. According to one embodiment of the invention, those techniques are performed by computer system 700 in response to processor 702 executing one or more sequences of one or more instructions contained in memory 704. Such instructions, also called software and program code, may be read into memory 704 from another computer-readable medium such as storage device 708. Execution of the sequences of instructions contained in memory 704 causes processor 702 to perform the method steps described herein. In alternative embodiments, hardware, such as application specific integrated circuit 720, may be used in place of or in combination with software to implement the invention. Thus, embodiments of the invention are not limited to any specific combination of hardware and software.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server 792 transmits program code for a particular application, requested by a message sent from computer 700, through Internet 790, ISP equipment 784, local network 780 and communications interface 770. The received code may be executed by processor 702 as it is received, or may be stored in storage device 708 or other non-volatile storage for later execution, or both. In this manner, computer system 700 may obtain application program code in the form of a signal on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red a carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

Figure 8:
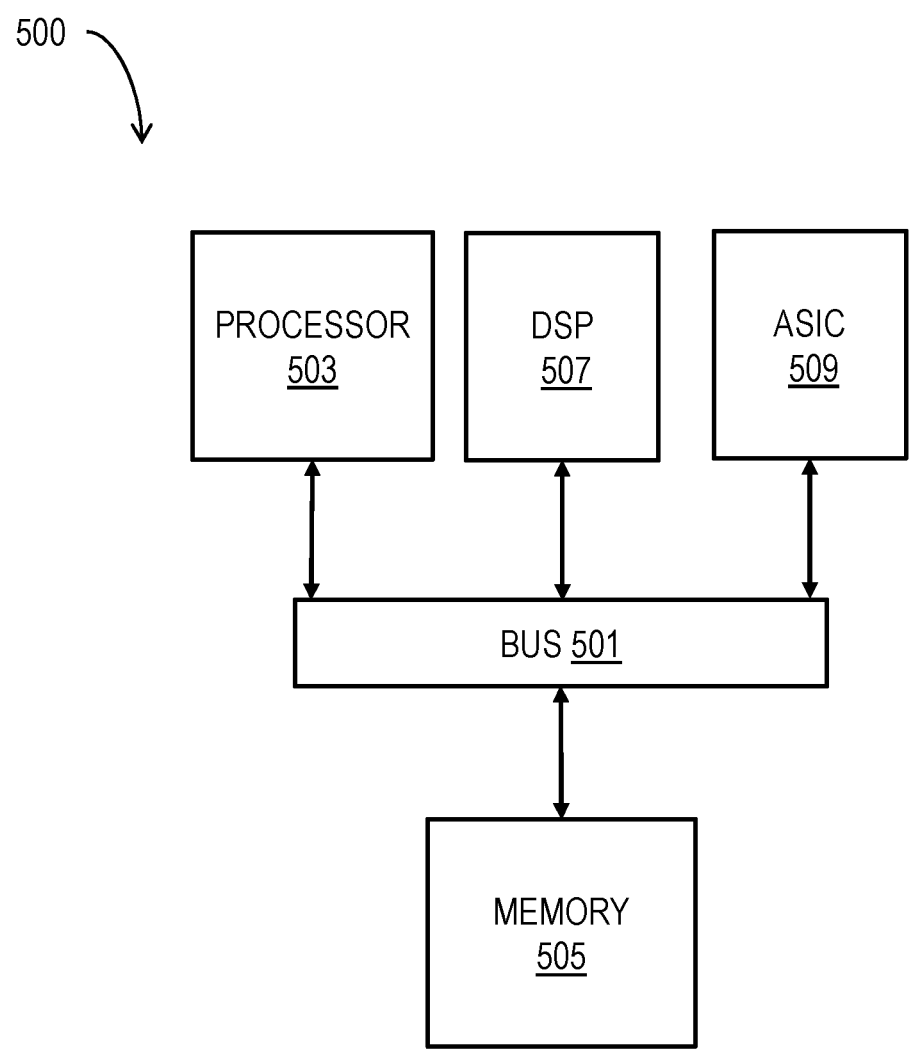
FIG. 8 illustrates a chip set upon which an embodiment of the invention may be implemented.

FIG. 8 illustrates a chip set 800 upon which an embodiment of the invention may be implemented. Chip set 800 is programmed to perform one or more steps of a method described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 800, or a portion thereof, constitutes a means for performing one or more steps of a method described herein.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 805 also stores the data associated with or generated by the execution of one or more steps of the methods described herein.

Figure 9:
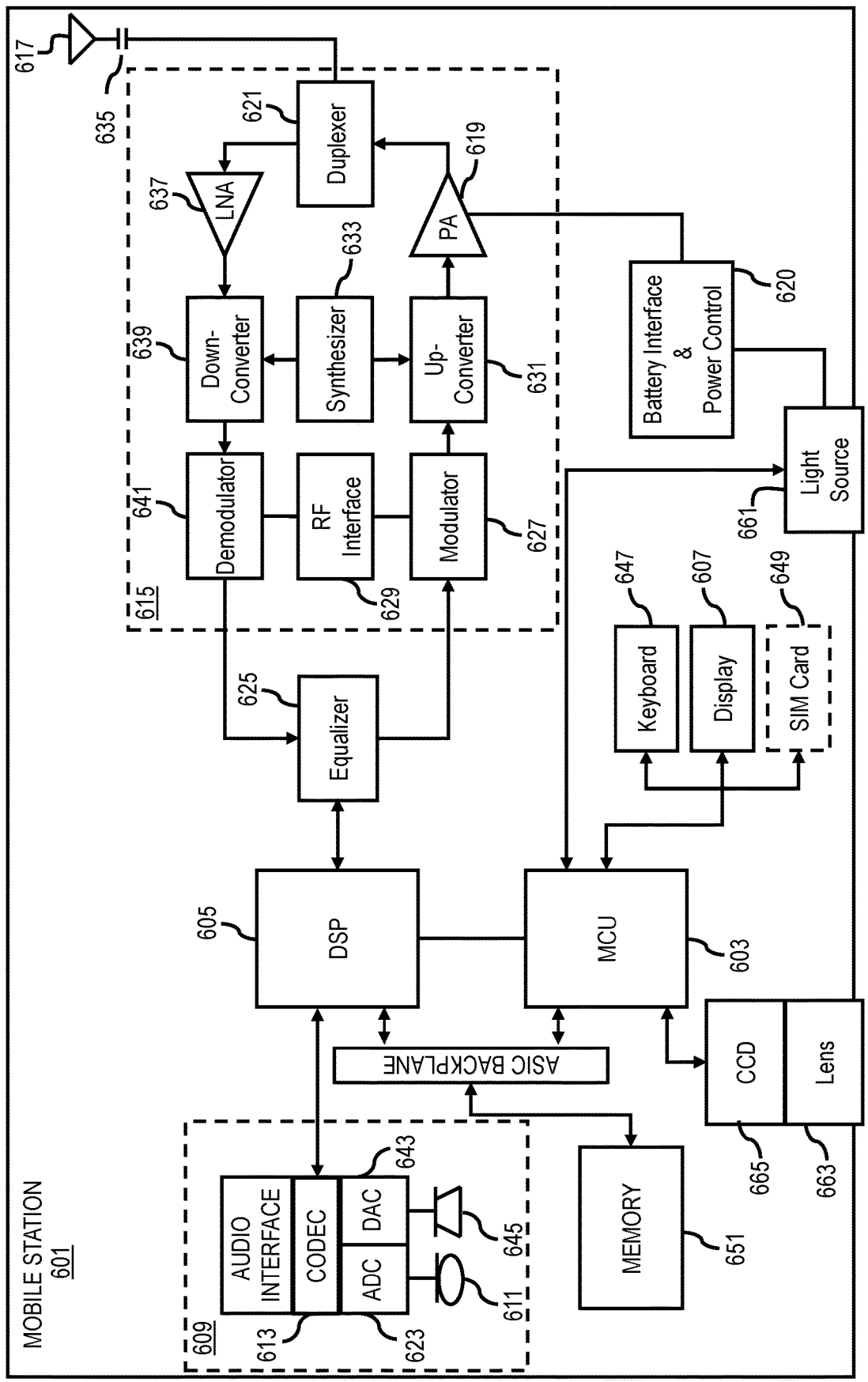
FIG. 9 is a diagram of exemplary components of a mobile terminal (e.g., cell phone handset) for communications, which is capable of operating in the system of FIG. 2B, according to one embodiment.

FIG. 9 is a diagram of exemplary components of a mobile terminal 900 (e.g., cell phone handset) for communications, which is capable of operating in the system of FIG. 2B, according to one embodiment. In some embodiments, mobile terminal 901, or a portion thereof, constitutes a means for performing one or more steps described herein. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps as described herein. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 as described herein. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

In some embodiments, the mobile terminal 901 includes a digital camera comprising an array of optical detectors, such as charge coupled device (CCD) array 965. The output of the array is image data that is transferred to the MCU for further processing or storage in the memory 951 or both. In the illustrated embodiment, the light impinges on the optical array through a lens 963, such as a pin-hole lens or a material lens made of an optical grade glass or plastic material. In the illustrated embodiment, the mobile terminal 901 includes a light source 961, such as a LED to illuminate a subject for capture by the optical array, e.g., CCD 965. The light source is powered by the battery interface and power control module 920 and controlled by the MCU 903 based on instructions stored or loaded into the MCU 903.

4. Alternatives, Deviations and Modifications

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article.

5. References

All the references listed here are hereby incorporated by reference as if fully set forth herein except for terminology inconsistent with that used herein.

1. Jimmy Ba, Ryan Kiros, and Geoffrey E. Hinton. Layer normalization. CoRR, 2016.
2. Dzmitry Bahdanau, Kyunghyun Cho, and Yoshua Bengio. Neural machine translation by jointly learning to align and translate. In ICLR, 2015.
3. Elizabeth Clark, Yangfeng Ji, and Noah A Smith. Neural text generation in stories using entity representations as context. In NAACL, pages 2250-2260, 2018.
4. Elizabeth Clark, Anne Spencer Ross, Chenhao Tan, Yangfeng Ji, and Noah A. Smith. Creative writing with a machine in the loop: Case studies on slogans and stories. In IUI, pages 329-340. ACM, 2018.
5. Angela Fan, Mike Lewis, and Yann Dauphin. Hierarchical neural story generation. Proceedings of the 56th Annual Meeting of the Association for Computational Linguistics, pages 889-898, 2018.
6. Angela Fan, Mike Lewis, and Yann N. Dauphin. Strategies for structuring story generation. In ACL 2019, pages 2650-2660, 2019.
7. Pablo Gerv' as, Bel'en D'laz-Agudo, Federico Peinado, and Raquel Herv' as. Story plot generation based on cbr. In Applications and Innovations in Intelligent Systems XII, 28(1):33-46, 2005.
8. Parag Jain, Priyanka Agrawal, Abhijit Mishra, Mohak Sukhwani, Anirban Laha, and Karthik Sankaranarayanan. Story generation from sequence of independent short descriptions. CoRR, pages 234-242, 2017.
9. Mubbasir Kapadia, Jessica Falk, Fabio Zünd, Marcel Marti, Robert W. Sumner, and Markus Gross. Computer-assisted authoring of interactive narratives. Proceedings of the 19th Symposium on Interactive 3D Graphics and Games, i3D 2015, 2015.
10. Diederik P Kingma and Jimmy Ba. Adam: A method for stochastic optimization. arXiv preprint arXiv:1412.6980, 2014.
11. Micheal Lebowitz. Planning stories. In Proceedings of the cognitive science society, pages 234-242, 1987.
12. Yann LeCun, Y Bengio, and Geoffrey Hinton. Deep learning. Nature, 521:436-44, 05 2015.
13. Jiwei Li, Michel Galley, Chris Brockett, Georgios P Spithourakis, Jianfeng Gao, and Bill Dolan. A persona-based neural conversation model. In ACL, 2016.
14. Peter J. Liu*, Mohammad Saleh*, Etienne Pot, Ben Goodrich, Ryan Sepassi, Lukasz Kaiser, and Noam Shazeer. Generating wikipedia by summarizing long sequences. In International Conference on Learning Representations, 2018.
15. Enrique Manjavacas, Folgert Karsdorp, Ben Burtenshaw, and Mike Kestemont. Synthetic literature: Writing science fiction in a co-creative process. In CC-NLG 2017, 2017.
16. Lara J. Martin, Prithviraj Ammanabrolu, Xinyu Wang, William Hancock, Shruti Singh, Brent Harrison, and Mark O. Riedl. Event representations for automated story generation with deep neural nets. In AAAI, 2018.
17. Nasrin Mostafazadeh, Nathanael Chambers, Xiaodong He, Devi Parikh, Dhruv Batra, Lucy Vanderwende, Pushmeet Kohli, and James F. Allen. A corpus and cloze evaluation for deeper understanding of commonsense stories. In NAACL, 2016.
18. Rafael P'erez y P'erez and Mike Sharples. Mexica: A computer model of a cognitive account of creative writing. J. Exp. Theor. Artif. Intell., 13:119-139, 04 2001.
19. Jullie Porteous and Mike Cavazza. Controlling narrative generation with planning trajectories: the role of constraints. In ICIDS, pages 234-245, 2009.
20. Mark O. Riedl and R. Michael Young. Narrative planning: Balancing plot and character. J. Artif. Int. Res., 39:217-268, 2010.
21. Melissa Roemmele and Andrew S. Gordon. Creative Help: A Story Writing Assistant. In Interactive Storytelling, pages 81-92. Springer International Publishing, 2015.
22. Melissa Roemmele. Writing Stories with Help from Recurrent Neural Networks. In AAAI Conference on Artificial Intelligence, pages 4311-4312, 2016.
23. Stuart Rose, Dave Engel, Nick Cramer, and Wendy Cowley. Automatic keyword extraction from individual documents. Text Mining: Applications and Theory, pages 1-20, 2010.
24. Ilya Sutskever, Oriol Vinyals, and Quoc V. Le. Sequence to sequence learning with neural networks. In NIPS, pages 3104-3112, 2014.
25. Reid Swanson and Andrew S. Gordon. Say Anything: Using Textual Case-Based Reasoning to Enable Open-Domain Interactive Storytelling. ACM Transactions on Interactive Intelligent Systems (TiiS), 2(3), September 2012.
26. Pradyumna Tambwekar, Murtaza Dhuliawala, Lara J. Martin, Animesh Mehta, Brent Harrison, and Mark O. Riedl. Controllable neural story plot generation via reward shaping. In IJCAI-19, pages 5982-5988, 2019.
27. Ashish Vaswani, Noam Shazeer, Niki Parmar, Jakob Uszkoreit, Llion Jones, Aidan N Gomez, Ł ukasz Kaiser, and Illia Polosukhin. Attention is all you need. In NIPS, pages 5998-6008, 2017.
28. Cheng Xing, Wei Wu, Yu wu, Jie Liu, Yalou Huang, Ming Zhou, and Wei-Ying Ma. Topic aware neural response generation. AAAI, 17:3351-3357, 2017.
29. Lili Yao, Nanyun Peng, Weischedel Ralph, Kevin Knight, Dongyan Zhao, and Rui Yan. Plan-and-write: Towards better automatic storytelling. AAAI, 2019.

What is claimed is:

1. A non-transitory computer-readable medium carrying one or more sequences of instructions, wherein execution of the one or more sequences of instructions by one or more processors causes the one or more processors to perform the steps of:
retrieving from a computer-readable medium first data that indicates text for a first one or more portions of a story;
receiving second data that indicates text for a cued subset of a next portion of the story;
generating third data that indicates full text for the next portion of the story based on the first data and the second data and a neural network trained with first training data that indicates text for a second one or more portions of a different second story and second training data that indicates text for a subset of text for an immediately following portion of the second story and third training data that indicates full text for the immediately following portion of the second story; and
concatenating the third data to the first data and writing to the computer-readable medium.

2. The non-transitory computer readable medium as recited in claim 1, wherein the text for the cued subset is received from a human user.

3. The non-transitory computer readable medium as recited in claim 1, wherein the first data for a next iteration of the method is set equal to the output data.

4. The non-transitory computer readable medium as recited in claim 1, wherein each portion of the first one or more portions and the next portion and the second one or more portions and the immediately following portion is a sentence.

5. The non-transitory computer readable medium as recited in claim 1, wherein the neural network includes:
a first attention based encoding network that generates a context-sensitive query vector and context-sensitive key vector and context-sensitive value vector based on a first matrix of vectors that are based on the first data;
a second attention based encoding network that generates a cue-sensitive query vector and cue-sensitive key vector and cue-sensitive value vector based on a second matrix of vectors that are based on the second data; and
a combination decoding network that generates a third matrix of vectors based at least in part on the context-sensitive key vector and the context-sensitive value vector and the cue-sensitive key vector and the cue-sensitive value vector,
wherein the third data is based on the third matrix of vectors.

6. An apparatus comprising:
at least one processor; and
at least one memory including one or more sequences of instructions,
the at least one memory and the one or more sequences of instructions configured to, with the
at least one processor, cause the apparatus to perform at least the following, retrieving from a computer-readable medium first data that indicates text for a first one or more portions of a story;
receiving second data that indicates text for a cued subset of a next portion of the story;
generating third data that indicates full text for the next portion of the story based on the first data and the second data and a neural network trained with first training data that indicates text for a second one or more portions of a different second story and second training data that indicates text for a subset of text for an immediately following portion of the second story and third training data that indicates full text for the immediately following portion of the second story; and
adding the third data to the first data and writing to the computer-readable medium.

7. The apparatus as recited in claim 6, wherein the text for the cued subset is received from a human user.

8. The apparatus as recited in claim 6, wherein the first data for a next iteration of the method is set equal to the output data.

9. The apparatus as recited in claim 6, wherein each portion of the first one or more portions and the next portion and the second one or more portions and the immediately following portion is a sentence.

10. The apparatus as recited in claim 6, wherein the neural network includes:
a first attention based encoding network that generates a context-sensitive query vector and context-sensitive key vector and context-sensitive value vector based on a first matrix of vectors that are based on the first data;
a second attention based encoding network that generates a cue-sensitive query vector and cue-sensitive key vector and cue-sensitive value vector based on a second matrix of vectors that are based on the second data; and
a combination decoding network that generates a third matrix of vectors based at least in part on the context-sensitive key vector and the context-sensitive value vector and the cue-sensitive key vector and the cue-sensitive value vector,
wherein the third data is based on the third matrix of vectors.

11. A method for artificial intelligence assisted generation of a story, comprising:
training automatically on a processor a neural network with first training data that indicates text for a one or more portions of a training story and second training data that indicates text for a subset of text for an immediately following portion of the training story and third training data that indicates full text for the immediately following portion of the training story;
retrieving automatically on the processor from a computer-readable medium first data that indicates text for a first one or more portions of a different new story;
receiving second data that indicates text for a cued subset of a next portion of the new story;
generating automatically on the processor third data that indicates full text for the next portion of the new story based on the first data and the second data and the neural network; and
adding automatically on the processor the third data to the first data and writing to the computer readable medium.

12. The method as recited in claim 11, wherein the text for the cued subset is received from a human user.

13. The method as recited in claim 11, wherein the first data for a next iteration of the method is set equal to the output data.

14. The method as recited in claim 11, wherein each portion of the first one or more portions and the next portion and the second one or more portions and the immediately following portion is a sentence.

15. The method as recited in claim 11, wherein the neural network includes:
a first attention based encoding network that generates a context-sensitive query vector and context-sensitive key vector and context-sensitive value vector based on a first matrix of vectors that are based on the first data;
a second attention based encoding network that generates a cue-sensitive query vector and cue-sensitive key vector and cue-sensitive value vector based on a second matrix of vectors that are based on the second data; and
a combination decoding network that generates a third matrix of vectors based at least in part on the context-sensitive key vector and the context-sensitive value vector and the cue-sensitive key vector and the cue-sensitive value vector,
wherein the third data is based on the third matrix of vectors.

* * * * *